United States Patent
Futryk et al.

(10) Patent No.: US 12,165,263 B1
(45) Date of Patent: Dec. 10, 2024

(54) WEB BROWSER DERIVED CONTENT INCLUDING REAL-TIME VISUALIZATIONS IN A THREE-DIMENSIONAL GAMING ENVIRONMENT

(71) Applicants: Dennis M. Futryk, San Jose, CA (US); Charles H. House, Portland, OR (US)

(72) Inventors: Dennis M. Futryk, San Jose, CA (US); Charles H. House, Portland, OR (US)

(73) Assignee: AstroVirtual, Inc., San Jose, CA (US)

(*) Notice: Subject to any disclaimer, the term of this patent is extended or adjusted under 35 U.S.C. 154(b) by 0 days.

(21) Appl. No.: 18/431,845

(22) Filed: Feb. 2, 2024

Related U.S. Application Data

(62) Division of application No. 18/080,216, filed on Dec. 13, 2022, now Pat. No. 11,935,195.

(51) Int. Cl.
| | |
|---|---|
| *A63F 13/65* | (2014.01) |
| *A63F 13/52* | (2014.01) |
| *G06F 3/01* | (2006.01) |
| *G06F 3/0483* | (2013.01) |
| *G06T 19/00* | (2011.01) |

(52) U.S. Cl.
CPC ............ *G06T 19/003* (2013.01); *A63F 13/52* (2014.09); *A63F 13/65* (2014.09); *G06F 3/011* (2013.01); *G06F 3/0483* (2013.01); *A63F 2300/8082* (2013.01); *G06T 2219/024* (2013.01)

(58) Field of Classification Search
CPC .. A63F 13/52; A63F 13/65; A63F 2300/8082; G06F 3/011; G06F 3/0483; G06T 19/003; G06T 2219/024
See application file for complete search history.

(56) References Cited

U.S. PATENT DOCUMENTS

| | | |
|---|---|---|
| 5,150,117 A | 9/1992 | Hamilton |
| 5,296,854 A | 3/1994 | Hamilton |
| 5,491,629 A | 2/1996 | Fox |
| 5,781,229 A | 7/1998 | Zediker |
| 5,796,932 A | 8/1998 | Fox |
| 5,838,262 A | 11/1998 | Kershner |
| 6,014,135 A | 1/2000 | Fernandes |
| 6,119,147 A | 8/2000 | Toomey |
| 6,769,013 B2 | 7/2004 | Frees |
| 6,791,582 B2 | 9/2004 | Linsey |
| 6,957,395 B1 | 10/2005 | Jobs |
| 7,030,890 B1 | 4/2006 | Jouet |
| 7,065,492 B2 | 6/2006 | Homsi |
| 7,082,430 B1 | 7/2006 | Danielsen |
| 7,155,435 B1 | 12/2006 | Day |
| 7,159,178 B2 | 1/2007 | Vogt |
| 7,467,356 B2 | 12/2008 | Gettman |
| 7,519,569 B1 | 4/2009 | Flynn |

(Continued)

OTHER PUBLICATIONS

3D Immersive Collaboration Consulting, LLC, "Capabilities Statement", © 2019, 1 page.

(Continued)

*Primary Examiner* — David L Lewis
*Assistant Examiner* — Shauna-Kay N. Hall
(74) *Attorney, Agent, or Firm* — Berkeley Law, LLC

(57) ABSTRACT

Briefly, embodiments, such as methods and/or systems of real-time visualization of web browser derived content within a gaming environment, for example, are described.

12 Claims, 26 Drawing Sheets
(25 of 26 Drawing Sheet(s) Filed in Color)

(56) References Cited

U.S. PATENT DOCUMENTS

| | | |
|---|---|---|
| 7,634,539 B2 | 12/2009 | Schwarz |
| 7,904,323 B2 | 3/2011 | Wynn |
| 8,204,480 B1 | 6/2012 | Lindteigen |
| 8,270,963 B1 | 9/2012 | Hart |
| 8,384,710 B2 | 2/2013 | Schlottmann |
| 8,458,800 B1 | 6/2013 | Van Voorhees |
| 8,495,731 B1 | 7/2013 | Mar |
| 8,892,252 B1 | 11/2014 | Troy |
| 9,258,337 B2 | 2/2016 | Hyndman |
| 9,298,283 B1 | 3/2016 | Lin |
| 9,573,062 B1 | 2/2017 | Long |
| 9,648,313 B1 | 5/2017 | Henry |
| 9,741,169 B1 | 8/2017 | Holz |
| 9,754,167 B1 | 9/2017 | Holz |
| 9,866,822 B1 | 1/2018 | Mitchell |
| 9,948,571 B2 | 4/2018 | Yuan |
| 10,101,745 B1 | 10/2018 | Sun |
| 10,129,072 B1 | 11/2018 | Field |
| 10,183,231 B1 | 1/2019 | Lowe |
| 10,191,887 B2 | 1/2019 | Sahdev |
| 10,356,216 B2 | 7/2019 | Khalid |
| 10,389,652 B2 | 8/2019 | Dick |
| 10,432,351 B2 | 10/2019 | Kujawski |
| 10,560,379 B1 | 2/2020 | Ghosh |
| 10,569,164 B1 | 2/2020 | Bleasdale-Shepherd |
| 10,581,696 B2 | 3/2020 | Shi |
| 10,587,725 B2 | 3/2020 | Ananthapadmanabh |
| 10,679,411 B2 | 6/2020 | Ziman |
| 10,698,770 B1 | 6/2020 | Kancharla |
| 10,718,631 B1 | 7/2020 | Wills |
| 10,823,843 B1 | 11/2020 | Kendra |
| 10,846,937 B2 | 11/2020 | Rogers |
| 10,996,481 B1 | 5/2021 | Wells |
| 11,042,673 B1 | 6/2021 | McLean |
| 11,080,978 B1 | 8/2021 | Goldstein |
| 11,094,001 B2 | 8/2021 | Koon |
| 11,106,911 B1 | 8/2021 | Fathi |
| 11,164,479 B1 | 11/2021 | Madison |
| 11,205,152 B1 | 12/2021 | Singh |
| 11,250,617 B1 | 2/2022 | Sempe |
| 11,327,701 B2 | 5/2022 | Himpe |
| 11,409,593 B1 | 8/2022 | Kumar |
| 11,416,958 B1 | 8/2022 | Reichert |
| 11,457,178 B2 * | 9/2022 | Krol ............... G06Q 50/01 |
| 11,471,775 B2 | 10/2022 | Benzies |
| 11,474,596 B1 | 10/2022 | Aloisio |
| 11,475,790 B2 | 10/2022 | May |
| 11,500,468 B1 | 11/2022 | Gruben |
| 11,747,891 B1 | 9/2023 | Hermsen |
| 11,935,195 B1 | 3/2024 | Futryk |
| 2001/0019337 A1 | 9/2001 | Kim |
| 2002/0052766 A1 | 5/2002 | Dingman |
| 2002/0061131 A1 | 5/2002 | Sawhney |
| 2002/0085025 A1 | 7/2002 | Busis |
| 2002/0107721 A1 | 8/2002 | Darwent |
| 2003/0125998 A1 | 3/2003 | McKenney |
| 2003/0101224 A1 | 5/2003 | Chiu |
| 2003/0179248 A1 | 9/2003 | Watson |
| 2005/0055424 A1 | 3/2005 | Smith |
| 2006/0022845 A1 | 2/2006 | Fischer |
| 2006/0055628 A1 | 3/2006 | Sanders-Reed |
| 2006/0284838 A1 | 12/2006 | Tsatalos |
| 2007/0011617 A1 | 1/2007 | Akagawa |
| 2007/0013691 A1 | 1/2007 | Jung |
| 2007/0013692 A1 | 1/2007 | Jung |
| 2007/0024613 A1 | 2/2007 | Jung |
| 2007/0035548 A1 | 2/2007 | Jung |
| 2007/0035549 A1 | 2/2007 | Jung |
| 2007/0038559 A1 | 2/2007 | Jung |
| 2008/0062167 A1 | 3/2008 | Boggs |
| 2008/0092065 A1 | 4/2008 | Jung |
| 2008/0218331 A1 | 9/2008 | Baillot |
| 2008/0221745 A1 | 9/2008 | Diamandis |
| 2009/0019367 A1 | 1/2009 | Cavagnari |
| 2009/0070180 A1 | 3/2009 | Jung |
| 2009/0100354 A1 | 4/2009 | Jung |
| 2009/0106671 A1 | 4/2009 | Olson |
| 2009/0106673 A1 | 4/2009 | Jung |
| 2009/0219189 A1 | 9/2009 | Bateman |
| 2009/0228418 A1 | 9/2009 | Ramesh |
| 2009/0241037 A1 | 9/2009 | Hyndman |
| 2010/0045662 A1 | 2/2010 | Boothroyd |
| 2010/0096491 A1 | 4/2010 | Whitelaw |
| 2010/0169795 A1 | 7/2010 | Hyndman |
| 2010/0261526 A1 | 10/2010 | Clark |
| 2010/0283636 A1 | 11/2010 | Clark |
| 2011/0009241 A1 | 1/2011 | Lane |
| 2011/0010022 A1 | 1/2011 | Beavin |
| 2011/0015816 A1 | 1/2011 | Dow |
| 2011/0063286 A1 | 3/2011 | Roberts |
| 2011/0106422 A1 | 5/2011 | Gould |
| 2011/0175796 A1 | 7/2011 | Pedro |
| 2011/0221745 A1 | 9/2011 | Goldman |
| 2011/0225516 A1 | 9/2011 | Goldman |
| 2011/0282130 A1 | 11/2011 | Krueger |
| 2012/0059378 A1 | 3/2012 | Farrell |
| 2012/0083324 A1 | 4/2012 | Perea-Ochoa |
| 2012/0136666 A1 | 5/2012 | Corpier |
| 2012/0169842 A1 | 7/2012 | Chuang |
| 2012/0242788 A1 | 9/2012 | Chuang |
| 2012/0245435 A1 | 9/2012 | Corpier |
| 2012/0266209 A1 | 10/2012 | Gooding |
| 2013/0048720 A1 | 2/2013 | Lewis |
| 2013/0051285 A1 | 2/2013 | Gunawardena |
| 2013/0135565 A1 | 5/2013 | Estrada |
| 2013/0196601 A1 | 8/2013 | Bobrow |
| 2013/0218931 A1 | 8/2013 | Lewis |
| 2013/0303146 A1 | 11/2013 | Van Voorhees |
| 2013/0333266 A1 | 12/2013 | Gose |
| 2013/0342572 A1 | 12/2013 | Poulos |
| 2014/0019628 A1 | 1/2014 | Shankar |
| 2014/0146394 A1 | 5/2014 | Tout |
| 2014/0152792 A1 | 6/2014 | Krueger |
| 2014/0157210 A1 | 6/2014 | Katz |
| 2014/0168229 A1 | 6/2014 | Ungureanu |
| 2014/0267637 A1 | 9/2014 | Hoberman |
| 2014/0268356 A1 | 9/2014 | Bolas |
| 2014/0320629 A1 | 10/2014 | Chizeck |
| 2014/0333412 A1 | 11/2014 | Lewis |
| 2014/0335948 A1 | 11/2014 | Jung |
| 2014/0361957 A1 | 12/2014 | Hua |
| 2014/0365240 A1 | 12/2014 | Canton |
| 2015/0022630 A1 | 1/2015 | Shafir |
| 2015/0033305 A1 | 1/2015 | Shear |
| 2015/0091906 A1 * | 4/2015 | Dishno ............... G06F 16/9577 345/427 |
| 2015/0172545 A1 | 6/2015 | Szabo |
| 2015/0245167 A1 | 8/2015 | Bobrow |
| 2015/0310758 A1 | 10/2015 | Daddona |
| 2016/0166930 A1 | 6/2016 | Brav |
| 2016/0171846 A1 | 6/2016 | Brav |
| 2016/0184703 A1 | 6/2016 | Brav |
| 2016/0225226 A1 | 8/2016 | Pereo-Ochoa |
| 2016/0226719 A1 | 8/2016 | Ong |
| 2016/0264045 A1 | 9/2016 | Ng-Thow-Hing |
| 2016/0267241 A1 | 9/2016 | Bacchi |
| 2016/0321906 A1 | 11/2016 | Whitney |
| 2017/0011602 A1 | 1/2017 | Brav |
| 2017/0041265 A1 | 2/2017 | Simpson |
| 2017/0041435 A1 | 2/2017 | Simpson |
| 2017/0087473 A1 | 3/2017 | Siegel |
| 2017/0090687 A1 | 3/2017 | Ali |
| 2017/0090736 A1 | 3/2017 | King |
| 2017/0093644 A1 | 3/2017 | Paul |
| 2017/0093874 A1 | 3/2017 | Uthe |
| 2017/0106537 A1 | 4/2017 | Chizeck |
| 2017/0160815 A1 | 6/2017 | Glazier |
| 2017/0169616 A1 | 6/2017 | Wiley |
| 2017/0200305 A1 | 7/2017 | Oddo |
| 2017/0256096 A1 | 9/2017 | Faaborg |
| 2017/0316317 A1 | 11/2017 | Waters |
| 2017/0336637 A1 | 11/2017 | Van Heugten |
| 2017/0352185 A1 | 12/2017 | Acevedo |
| 2017/0357480 A1 | 12/2017 | La Placa |

(56) References Cited

U.S. PATENT DOCUMENTS

| | | |
|---|---|---|
| 2017/0367771 A1 | 12/2017 | Tako |
| 2017/0372499 A1 | 12/2017 | Lalonde |
| 2018/0040162 A1 | 2/2018 | Donnelly |
| 2018/0040163 A1 | 2/2018 | Donnelly |
| 2018/0086336 A1 | 3/2018 | Jones |
| 2018/0087907 A1 | 3/2018 | DeBitetto |
| 2018/0089538 A1 | 3/2018 | Graham |
| 2018/0096532 A1 | 4/2018 | Srivastav |
| 2018/0176502 A1 | 6/2018 | Bhuruth |
| 2018/0203100 A1 | 7/2018 | McKitterick |
| 2018/0286258 A1 | 10/2018 | Derbanne |
| 2018/0312101 A1* | 11/2018 | Abohammdan ....... B62D 33/02 |
| 2018/0356895 A1 | 12/2018 | Dailey |
| 2018/0364803 A1 | 12/2018 | Khalid |
| 2018/0370591 A1 | 12/2018 | Denninger |
| 2019/0043264 A1 | 2/2019 | Tomizuka |
| 2019/0049977 A1 | 2/2019 | Dean |
| 2019/0065850 A1 | 2/2019 | Stryjewski |
| 2019/0097909 A1 | 3/2019 | Puri |
| 2019/0114840 A1 | 4/2019 | Zankowski |
| 2019/0164430 A1 | 5/2019 | Nix |
| 2019/0199993 A1 | 6/2019 | Babu |
| 2019/0213290 A1 | 7/2019 | Delva |
| 2019/0232047 A1 | 8/2019 | Chu |
| 2019/0236365 A1 | 8/2019 | Speasl |
| 2019/0236732 A1 | 8/2019 | Speasl |
| 2019/0260769 A1 | 8/2019 | Sharon |
| 2019/0310761 A1 | 10/2019 | Agarawala |
| 2019/0317718 A1 | 10/2019 | George |
| 2019/0324456 A1 | 10/2019 | Ryan |
| 2019/0392725 A1 | 12/2019 | Zalkins |
| 2020/0004751 A1 | 1/2020 | Stennett |
| 2020/0012990 A1 | 1/2020 | Bhargava |
| 2020/0023916 A1 | 1/2020 | Mackarvich |
| 2020/0027358 A1 | 1/2020 | Fine |
| 2020/0035203 A1 | 1/2020 | Kosik |
| 2020/0067985 A1 | 2/2020 | Bhargava |
| 2020/0074839 A1 | 3/2020 | Trigg |
| 2020/0082574 A1 | 3/2020 | Hegde |
| 2020/0137118 A1 | 4/2020 | Lyon |
| 2020/0142475 A1* | 5/2020 | Paez ................... G06F 3/04845 |
| 2020/0154189 A1 | 5/2020 | Tiscareno |
| 2020/0320794 A1 | 5/2020 | Huang |
| 2020/0278433 A1 | 9/2020 | Vanhakartano |
| 2020/0280986 A1 | 9/2020 | Peterson |
| 2020/0306974 A1 | 10/2020 | Fattey |
| 2020/0320789 A1 | 10/2020 | Duriseti |
| 2020/0355823 A1 | 11/2020 | Tingley |
| 2020/0368616 A1 | 11/2020 | Delamont |
| 2021/0035365 A1 | 2/2021 | James |
| 2021/0037183 A1 | 2/2021 | Pang |
| 2021/0070307 A1 | 3/2021 | Welch |
| 2021/0084259 A1 | 3/2021 | Kies |
| 2021/0105435 A1 | 4/2021 | Ritchey |
| 2021/0109355 A1 | 4/2021 | Chang |
| 2021/0111972 A1 | 4/2021 | Koutitas |
| 2021/0157135 A1 | 5/2021 | Wells |
| 2021/0191392 A1 | 6/2021 | Talavera |
| 2021/0243072 A1 | 8/2021 | Peterson |
| 2021/0256938 A1 | 8/2021 | Xu |
| 2021/0208578 A1 | 10/2021 | Benzies |
| 2022/0014865 A1 | 1/2022 | Teevens |
| 2022/0067153 A1 | 3/2022 | Roy |
| 2022/0124283 A1* | 4/2022 | Krol ..................... A63F 13/213 |
| 2022/0137612 A1 | 5/2022 | He |
| 2022/0139241 A1 | 5/2022 | Teague |
| 2022/0199267 A1 | 6/2022 | Subramanian |
| 2022/0242450 A1 | 8/2022 | Sokolov |
| 2022/0248499 A1 | 8/2022 | Dressendofer |
| 2022/0255995 A1 | 8/2022 | Berliner |
| 2022/0284317 A1 | 9/2022 | Lolla |
| 2022/0315051 A1 | 10/2022 | Patel |
| 2022/0334787 A1 | 10/2022 | Jogan |
| 2022/0366244 A1 | 11/2022 | Vandeventer |
| 2022/0406158 A1 | 12/2022 | Mahmoud |
| 2023/0007085 A1 | 1/2023 | Berliner |
| 2023/0102182 A1 | 3/2023 | Lee |
| 2023/0104636 A1 | 4/2023 | Shaw |
| 2023/0161341 A1 | 5/2023 | Montoya |
| 2023/0176368 A1 | 6/2023 | He |
| 2023/0237284 A1 | 7/2023 | Schmidt |
| 2023/0260058 A1 | 8/2023 | Rousis |
| 2023/0288167 A1 | 9/2023 | Broadway |
| 2023/0308605 A1 | 9/2023 | Ritchey |
| 2023/0333552 A1 | 10/2023 | Duguid |
| 2023/0376625 A1 | 11/2023 | Soryal |
| 2023/0379353 A1 | 11/2023 | Fichter |
| 2024/0004976 A1 | 1/2024 | Belenkii |
| 2024/0016561 A1 | 1/2024 | Fey |
| 2024/0019224 A1 | 1/2024 | O'Dell |
| 2024/0022486 A1 | 1/2024 | Lyon |
| 2024/0027157 A1 | 1/2024 | Canty |
| 2024/0031439 A1 | 1/2024 | Chevalier |

OTHER PUBLICATIONS

3D Immersive Collaboration Consulting, LLC, "3D Virtual Locations for Real Work", https://www.3dicc.com/, accessed Feb. 5, 2023, 14 pages.

Amazon Web Services (AWS), "AWS GameKit for Unreal Game Engine is now Generally Available", https://aws.amazon.com/about-aws/whats-new/2022/03/aws-gamekit-unreal-engine/, posted Mar. 23, 2022, accessed Feb. 5, 2023, 1 page.

Amazon Web Services (AWS), "Start Building on AWS Today", https://aws.amazon.com/, accessed Feb. 5, 2023, 1 page.

Bostock, Mike and Observable, Inc., "D3—Bring your data to life", https://observablehg.com/@d3/gallery, Aug. 31, 2022, © 2023 Observable, Inc., accessed Feb. 5, 2023, 25 pages.

Cgtrader, "Buy Professional 3D models", https://www.cgtrader.com/3d-models, © CGTrader 2011-2023, accessed Feb. 5, 2023, 6 pages.

Epic Games, "Unreal Engine—Unreal Engine 4.27 Documentation—Customizing the Player Web Page", https://docs.unrealengine.com/4.27/en-US/SharingAndReleasing/PixelStreaming/CustomPlayer/, © 2004-2023, Epic Games, Inc., accessed Feb. 5, 2023, 16 pages.

Epic Games, "Unreal Engine—Unreal Engine 4.27 Documentation—Introduction to Blueprints", https://docs.unrealengine.com/4.27/en-US/ProgrammingAndScripting/Blueprints/GettingStarted/, © 2004-2023, Epic Games, Inc., accessed Feb. 5, 2023, 7 pages.

Epic Games, "Unreal Engine—Unreal Engine 5.0 Documentation—Unreal Engine 5 WebBrowser", https://docs.unrealengine.com/5.0/en-US/API/Runtime/WebBrowser/, © 2004-2023, Epic Games, Inc., accessed Feb. 5, 2023, 5 pages.

Few, Stephen and Interaction Design Foundation, "The Encyclopedia of Human-Computer Interaction", Second Edition, Chapter 35 "Data Visualization for Human Perception", Jan. 1, 2014, 33 pages.

Few, Stephen, "Tapping the Power of Visual Perception", http://www.perceptualedge.com/articles/je/visual_perception.pdf, Sep. 4, 2004, accessed Feb. 5, 2023, 8 pages.

Friendly, Michael, "A Brief History of Data Visualization," Handbook of Computational Statistics: Data Visualization, Mar. 21, 2006, 44 pages.

House, Chuck. YouTube Video: "Chuck House Virtual Exposition Center—21 Min 49 sec", posted by user anywhereanytime on Nov. 4, 2022, https://www.youtube.com/watch?v=PkarQkMpmiE, accessed Feb. 5, 2023, 1 page.

Kay, Alan, YouTube Video: "Croquet Demo (2003)" posted by user Every Alan Kay Video posted on Jul. 17, 2019 https://www.youtube.com/watch?v=uQTeWJNkyll, recording of presentation at Etech 2003, accessed Feb. 5, 2023, 1 page.

Lemon, Sumner, "Intel's 3D User Interface Gets an Collaboration Application", ABCNews.com, https://abcnews.go.com/Technology/PCWorld/story?id=3630571, accessed Feb. 5, 2023, 2 pages.

Magee, Mike, "Here comes Intel's Miramar", The Register, Sep. 16, 1998, https://www.theregister.com/1998/09/16/here_comes_intels_miramar/, accessed Feb. 5, 2023, 6 pages.

Microsoft Azure, "Microsoft Azure portal", https://azure.microsoft.com/en-us/get-started/azure-portal, accessed Feb. 5, 2023, 1 page.

(56) References Cited

OTHER PUBLICATIONS

Microsoft, "Microsoft Power BI Blog—Gartner", https://powerbi.microsoft.com/en-us/blog/tag/gartner/, © 2023 Microsoft, accessed Feb. 5, 2023, 15 pages.
Microsoft, "Quickstart: Create a Game Development Virtual Machine with Unreal Engine", https://learn.microsoft.com/en-us/gaming/azure/game-dev-virtual-machine/create-game-development-vm-for-unreal, Jan. 19, 2023, accessed Feb. 5, 2023.
Microsoft, "Windows Blogs—Creating your own browser with HTML and JavaScript", https://blogs.windows.com/msedgedev/2015/08/27/creating-your-own-browser-with-html-and-javascript/, Aug. 27, 2015, © Microsoft 2023, accessed Feb. 5, 2023, 6 pages.
Nvidia, "Developer—RTX Technology", https://developer.nvidia.com/rtx/ray-tracing, © 2023 NVIDIA Corporation, accessed Feb. 5, 2023, 15 pages.
Qube, "Build your new world. Learn how in ours.", https://home.qube.cc/, accessed Feb. 5, 2023, 11 pages.
ShouldIRemoveIt.com, Program Search Results for "3d ICC Terf", https://www.shouldiremoveit.com/3d-ICC-Terf-119053-program.aspx, accessed Jan. 15, 2023, 3 pages.
Teleplace.wordpress.com, "The Teleplace Blog—Moving Immersive Collaboration Forward", https://teleplace.wordpress.com/2011/05/03/moving-immersive-collaboration-forward, May 3, 2011, accessed Feb. 5, 2023, 5 pages.
Wenczel, Heiko, "Unreal Engine—Streaming Unreal Engine content to multiple platforms—Comparison of HTML5, WebGL, and Pixel Streaming", Copyright © 2020 Epic Games, Inc., accessed at https://www.unrealengine.com/en-US/tech-blog/discover-pixel-streaming-real-time-distributed-content-for-any-device, accessed Feb. 5, 2023, 14 pages.
Wikipedia, "Unreal Engine", https://en.wikipedia.org/wiki/Unreal_Engine, last edited on Feb. 5, 2023, at 22:55 (UTC), accessed Feb. 5, 2023, 28 pages.
Wikipedia, "OpenQwag", https://en.wikipedia.org/wiki/OpenQwaq, last edited on Jun. 11, 2022, at 10:19 (UTC), accessed Feb. 5, 2023, 4 pages.
Wikipedia, "Croquet OS", https://en.wikipedia.org/wiki/Croquet_OS, last edited on Dec. 25, 2022, at 15:02 (UTC), accessed Feb. 5, 2023, 6 pages.
Wikipedia, "Open Cobalt", https://en.wikipedia.org/wiki/Open_Cobalt, last edited on Dec. 25, 2022, at 15:01 (UTC), accessed Feb. 5, 2023, 6 pages.
Zoominfo.com, Company Search Results for "3d ICC", https://www.zoominfo.com/c/3d-icc/354627180, accessed Jan. 15, 2023, 7 pages.
Slide Presentation—"Situational Awareness, How to gain and maintain it" https://slidetodoc.com/situational-awareness-how-to-gain-and-maintain-it/ accessed Apr. 13, 2024, 31 pages.
Slide Presentation—"Critical Thinking, An Introduction to Situational Awareness and Decisionmaking", https://studylib.net/doc/9711154/critical-thinking-an-introduction-to-situational-awareness, accessed Apr. 13, 2024, 16 pages.
SKYbrary Aviation Safety, "Situational Awareness (OGFA BN)" https://skybrary.aero/articles/situational-awareness-oghfa-bn accessed Apr. 13, 2024, copyright 2021-2024, 11 pages.
U.S. Appl. No. 18/080,216: Patent application as filed Dec. 13, 2022, 125 pages.
U.S. Appl. No. 18/080,216: Filing Receipt issued Jan. 5, 2023, 5 pages.
U.S. Appl. No. 18/080,216: Filing Receipt issued Jan. 20, 2023, 4 pages.
U.S. Appl. No. 18/080,216: Patent Application as filed Jan. 29, 2023, 121 pages.
U.S. Appl. No. 18/080,216: Amendment filed Jan. 30, 2023, 5 pages.
U.S. Appl. No. 18/080,216: Amendment filed Feb. 2, 2023, 5 pages.
U.S. Appl. No. 18/080,216: Amendment and Petition to Accept Color Drawings filed Feb. 6, 2023.
U.S. Appl. No. 18/080,216: Updated filing Receipt issued Feb. 9, 2023, 4 pages.
U.S. Appl. No. 18/080,216: Decision dismissing Petition to Accept Color Drawings dated Mar. 7, 2023, 4 pages.
U.S. Appl. No. 18/080,216: Amendment and Petition to Accept Color Drawings filed Mar. 22, 2023, 66 pages.
U.S. Appl. No. 18/080,216: Decision granting Petition to Accept Color Drawings dated Mar. 29, 2023, 4 pages.
U.S. Appl. No. 18/080,216: Preliminary Amendment filed Apr. 18, 2023, 8 pages.
U.S. Appl. No. 18/080,216: Petition to Make Special filed Aug. 14, 2023, 2 pages.
U.S. Appl. No. 18/080,216: Grant of Petition to Make Special dated Aug. 14, 2023, 1 page.
U.S. Appl. No. 18/080,216: Restriction Requirement issued Oct. 10, 2023, 10 pages.
U.S. Appl. No. 18/080,216: Response to Restriction Requirement and Amendment filed Oct. 19, 2023, 12 pages.
U.S. Appl. No. 18/080,216: Non-final Office Action issued Dec. 5, 2023, 17 pages.
U.S. Appl. No. 18/080,216: Non-final Office Action issued Jan. 4, 2024, 18 pages.
U.S. Appl. No. 18/080,216: Amendment filed Jan. 10, 2024, 15 pages.
U.S. Appl. No. 18/080,216: Examiner Interview Summary dated Jan. 23, 2024, 3 pages.
U.S. Appl. No. 18/080,216: Notice of Allowance issued Feb. 2, 2024, 12 pages.
U.S. Appl. No. 18/080,216: Issue Fee and Amendment filed Feb. 2, 2024, 10 pages.
U.S. Appl. No. 18/080,216: Notice of Allowance issued Feb. 13, 2024, 7 pages.
U.S. Appl. No. 18/080,216: Issue Notification issued Feb. 28, 2024, 7 pages.

\* cited by examiner 130　　　120　　140　　　　　110

100

120

300

400

500

600

700

800

610

1000

1200

1500

1600

1800

1900

2000

2100

2300

2400

2500

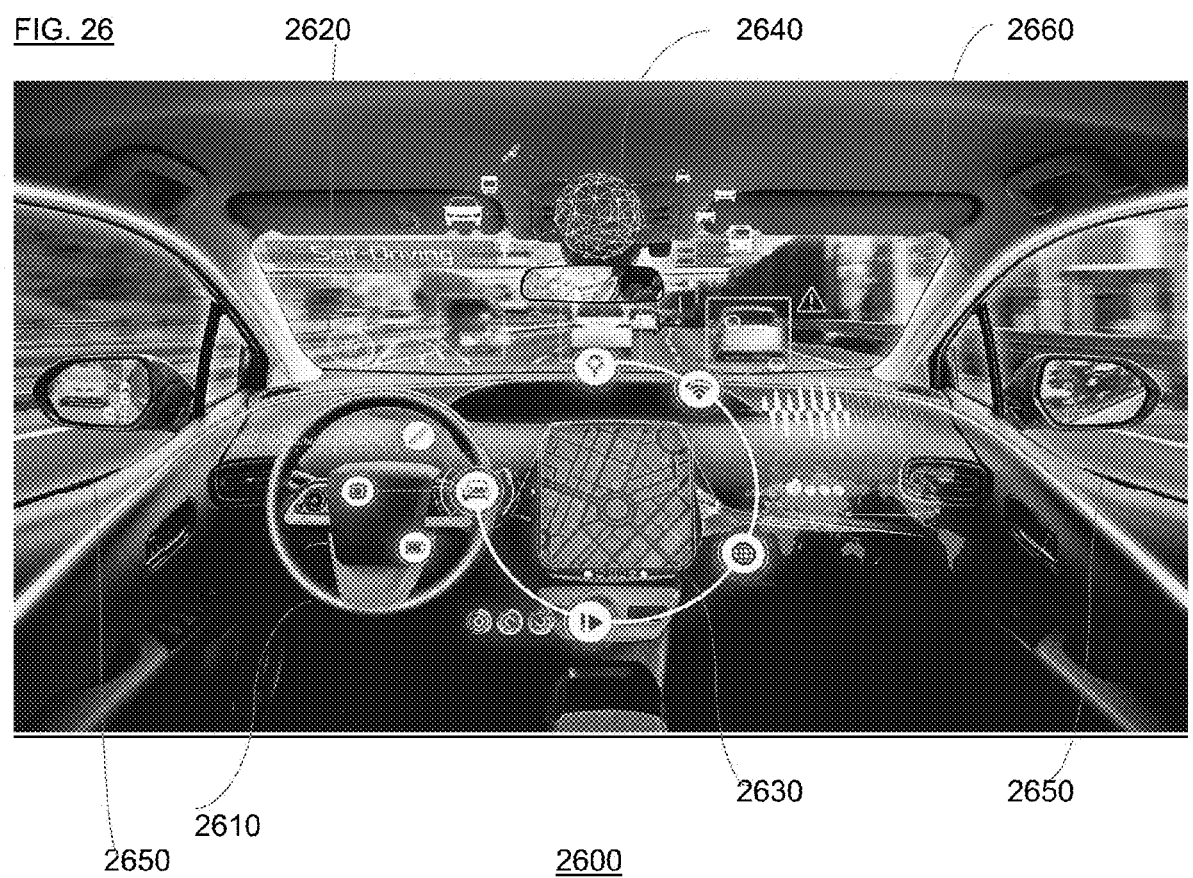

WEB BROWSER DERIVED CONTENT INCLUDING REAL-TIME VISUALIZATIONS IN A THREE-DIMENSIONAL GAMING ENVIRONMENT

BACKGROUND

1. Field

This disclosure relates to web browser derived content that includes real-time visualizations appearing in a three-dimensional (3D) gaming environment.

2. Information

In certain situations, individuals may digest content, such as, during a visit to a museum, walking through an exposition, or experiencing an institution's Hall of Fame. Likewise, for a business, a CEO, executive staff (e.g., CFO, COO, CSO, CIO, etc.) a founder, partners, etc., may need to digest various types of content employed to communicate status information to such individuals, often important or even critical status information. Often images, videos, power point slides, word documents, web pages, email messages, text messages, audio recordings, and so on, may be employed as non-limiting examples. However, for an individual in either of these situations to digest the information being communicated via such content, for example, in real-time, may at times be daunting.

Mechanisms, such as web pages, have been devised, but still often fall short of the task. For one thing, the content may not be in a web page form. Furthermore, even web pages may be limited in terms of the amount and/or variety of content types that may be communicated in real-time and in one place. As mentioned, the content to be communicated may not exist in an appropriate form; however, in addition, navigating between web pages, such as for a website or even between different websites, may be time-consuming, cumbersome, and/or be distracting to an individual attempting to digest a large amount of content quickly, as is typically desirable in a number of situations.

Another disadvantage may be that those web pages and/or websites may not be available in real-time to others who may be remotely located from a decisionmaker. That decisionmaker may be navigating between different forms of content and across many web pages and/or websites in a manner so as to digest the real-time information conveyed by that content but may also seek the advice of one or more subject matter experts before making a decision.

It would be desirable if another, better, approach existed to communicate a large amount content, in various forms, to one or even to multiple individuals in real-time, including real-time updates, if appropriate.

BRIEF DESCRIPTION OF DRAWINGS

The patent or application file contains at least one drawing executed in color. Copies of this patent or patent application publication with color drawing(s) will be provided by the Office upon request and payment of the necessary fee.

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 26 is a schematic diagram of a closed loop process for driving a car, which may be implemented via an embodiment in accordance with claimed subject matter.

DETAILED DESCRIPTION

Figure 1:
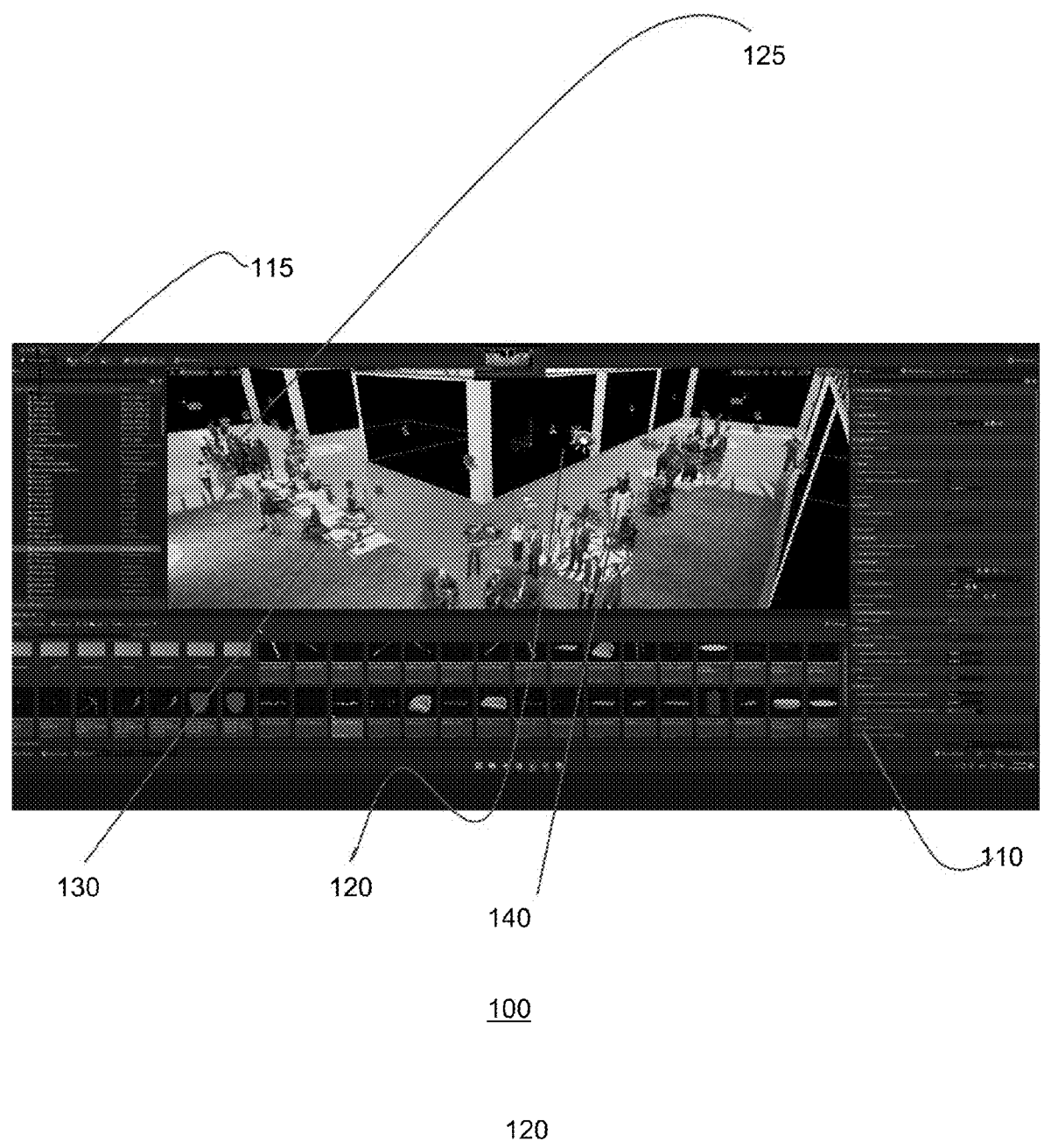
FIG. 1 is an illustration of a window of an embodiment of a computer-generated three-dimensional (3D) gaming environment that may be edited to provide a host of 3D virtual displays in accordance with claimed subject matter.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims and are not necessarily intended to refer to a complete claim set, to a particular combination of claim sets (e.g., method claims, apparatus claims, etc.), or to a particular claim.

In certain situations, individuals may digest content, such as, during a visit to a museum, walking through an exposition, or experiencing an institution's Hall of Fame. Likewise, for a business, a CEO, executive staff (e.g., CFO, COO, CSO, CIO, etc.) a founder, partners, etc., may need to digest various types of content employed to communicate status information to such individuals, often important or even critical status information. Often images, videos, power point slides, word documents, web pages, email messages, text messages, audio recordings, and so on, may be employed as non-limiting examples. However, for an individual in either of these situations to digest the information being communicated via such content, for example, in real-time, may at times be daunting.

Mechanisms, such as web pages, have been devised, but still, often fall short of the task. For one thing, the content may not be in a web page form. Furthermore, even web pages may be limited in terms of the amount and/or variety of content types that may be communicated in real-time and in one place. As mentioned, the content to be communicated may not exist in an appropriate form; however, in addition, navigating between web pages, such as for a website or even between different websites, may be time-consuming, cumbersome, and/or be distracting to an individual attempting to digest a large amount of content quickly, as is typically desirable in a number of situations, such as if managing a factory, managing a company, and so on.

Another disadvantage may be that those web pages and/or websites may not be available in real-time to others who may be remotely located from a decisionmaker. That decisionmaker may be navigating between different forms of content and across many web pages and/or websites in a manner so as to digest the real-time information conveyed by that content but may also seek the advice of one or more subject matter experts before making a decision. It would be desirable if another, better, approach existed to communicate a large amount content, in various forms, to one or even to multiple individuals in real-time, including real-time updates, if appropriate.

Figure 2:
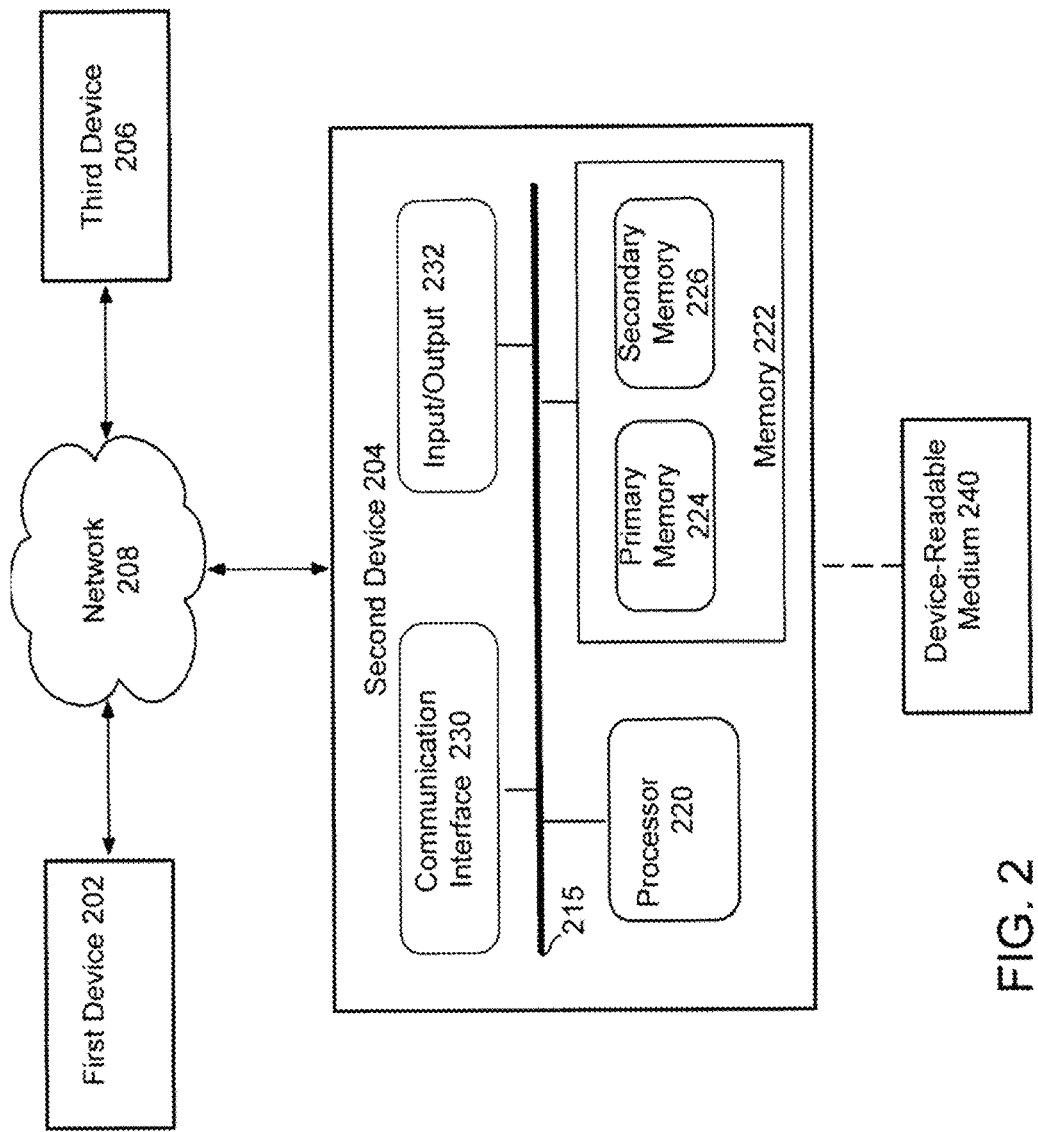
FIG. 2 is an illustration of a schematic diagram showing an embodiment of a computing and/or communications network that includes several computing devices able to mutually communicate via the computing and/or communications network.

Referring now to FIG. 2, in an embodiment, first and third devices 202 and 206 may be capable of rendering a graphical user interface (GUI) for a network device and/or a computing device, for example, so that a user-operator may engage in system use. Device 204 may potentially serve a similar function in this illustration. Likewise, in FIG. 2, computing device 202 ('first device' in figure) may interface with computing device 204 ('second device' in figure), which may, for example, comprise features of a client computing device and/or a server computing device, in an embodiment.

Processor (e.g., processing device) 220 and memory 222, which may comprise primary memory 224 and secondary memory 226, may communicate by way of a communication bus 215, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. It is further noted that the term "computing device," in general, whether employed as a client and/or as a server, or otherwise, refers at least to a processor and a memory connected by a communication bus, such as illustrated in FIG. 2. Thus, a computing device, in the context of the present patent application, may comprise hardware, software, firmware, or any combinations thereof (other than software per se). Computing device 204, as depicted in FIG. 2 is merely one example, and claimed subject matter is not limited in scope to this particular example.

For one or more embodiments, a device, such as a computing device and/or networking device, may comprise, for example, any of a wide range of digital electronic devices. These may include, but are not limited to, desktop and/or laptop computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combinations of the foregoing. These may also include, but are not otherwise limited to, current and/or next generation stand-alone virtual reality (VR), augmented reality (AR), mixed reality (MR), and/or "xtended" reality (XR) devices, or any combinations of the foregoing. Likewise, the terms computing device, computer, computer device, computer system, computer platform and the like may be used interchangeable without loss of generality or understanding. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a web-enabled computing device may include a physical and/or a virtual keyboard, mass storage, one or more accelerometers, one or more gyroscopes, global positioning system (GPS) and/or other location-identifying type capability, and/or a display with a high degree of functionality, such as a touch-sensitive color 2D or 3D display.

Communications between a computing device and/or a network device and a wireless network, as an example, may be in accordance with known and/or to be developed network protocols including, but not limited to, for example, global system for mobile communications (GSM), enhanced data rate for GSM evolution (EDGE), 802.11b/g/n/h, etc., worldwide interoperability for microwave access (WiMAX), 3G, 4G, 4G, 5G, as well as any or all next generation wireless network protocols, or any combinations thereof. A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that it may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as IOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

Additional details regarding the components of computing device 204 are described later. However, it is noted that, in an embodiment, computing device 204 may comprise a computing device or system that includes a state-of-the art graphics processor unit (GPU) and a state-of-the-art central processing unit (CPU), such as the Nvidia RTX3070 GPU, available from Nvidia Corp., and the Intel Core i9 microprocessor, available from Intel Corp., both located in San Jose, CA, as merely examples. It is noted, of course, that claimed subject matter is not limited in scope in this respect. Nonetheless, such an embodiment, for example, may include software capable of computer generating a three-dimensional gaming environment. Likewise, as indicated, claimed subject matter is not limited in scope in this respect.

In this context, the term "three-dimensional (3D) gaming environment" refers to a computer-generated three-dimensional virtual representation of a real-world environment, which may, as an example, be generated from geometric signal and/or state information, with the ability for a user to virtually move within and/or virtually interact with that three-dimensional virtual representation of a real-world environment. Furthermore, a 3D gaming environment, in an embodiment, may be fully immersive and photorealistic, as described in more detail below.

As another example of an embodiment, computing device 204 may comprise a server or even several servers, such as may be provided by Amazon Web Services (AWS), see https://aws.amazon.com/, or by Microsoft Azure, see https://azure.microsoft.com/en-us/get-started/azure-portal. For example, such one or more servers may include software executable to provide a "virtual machine," denoted VM, so that it is not necessary to own a computing device or system to have the capability to computer generate a 3D gaming environment for others to access. That is, for such an embodiment, computing device 204, for example, may be accessible via a network, such as via the Internet or the Worldwide Web. Again, claimed subject matter is not intended to be limited in scope to this illustrative example.

Thus, in an embodiment, a computing device 204 may execute 3D rendering software and/or other similar software tools to computer generate a three-dimensional gaming environment. A host of commercial application software is available in this regard. As simply one example, Unreal Engine software, available from Epic Games, see https://en.wikipedia.org/wiki/Unreal_Engine, may be employed to computer generate a three-dimensional gaming environment. Furthermore, if employing a virtual machine, as described above, for an embodiment, AWS, see https://aws.amazon.com/about-aws/whats-new/2022/03/aws-gamekit-unreal-engine/and Azure, see https://learn.microsoft.com/en-us/gaming/azure/game-dev-virtual-machine/create-game-development-vm-for-unreal, both support Unreal Engine.

Figure 3:
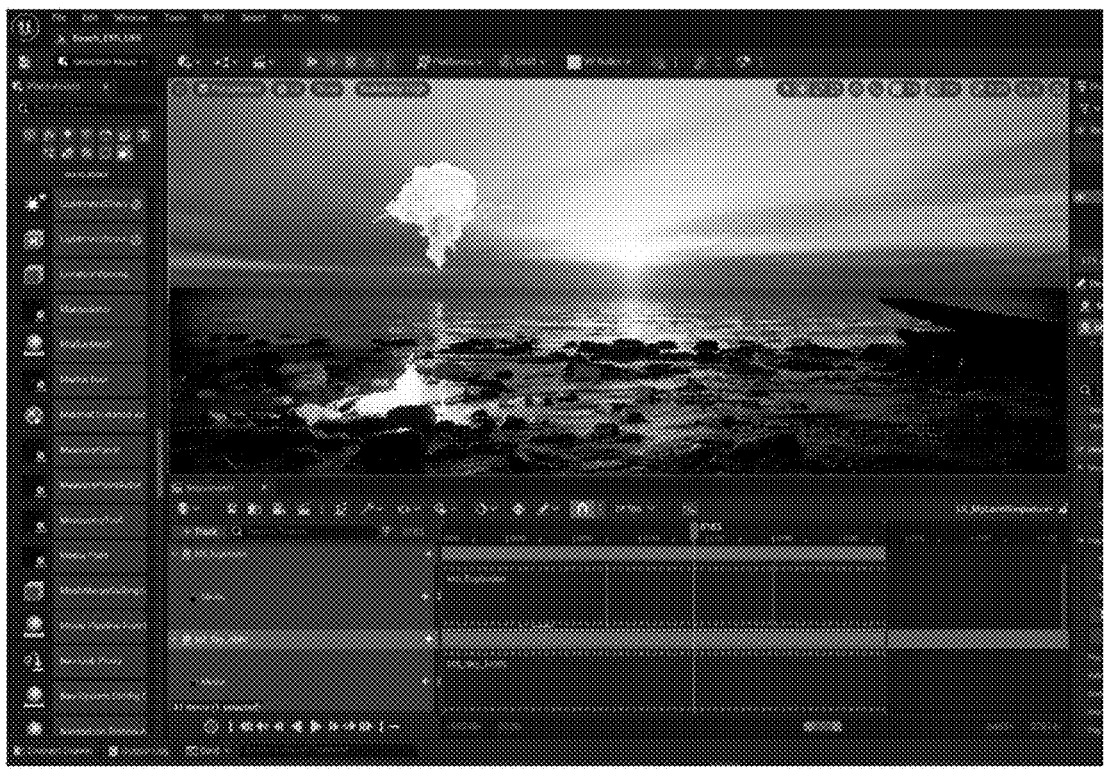
FIG. 3 is a window illustrating an image of Unreal Engine 5.1, available from Epic Games.

Unreal Engine (UE) is a three-dimensional (3D) computer graphics game engine developed by Epic Games, first showcased in the 1998 first-person shooter game Unreal. Initially developed for PC first-person shooters, it has since been used in a variety of genres of games and has also seen adoption by other industries, most notably the film and television industry. Written in C++, the Unreal Engine features a high degree of portability, supporting a wide range of desktop, mobile, console and/or virtual reality platforms. The latest generation, Unreal Engine 5, was launched in April 2022. Its source code is available on GitHub after registering an account, and commercial use is granted based on a royalty model. It is noted that there are several versions of Unreal Engine. For example, versions 4 and above, including versions that may later be developed, are included as illustrative examples. Referring to FIG. 3, as one example, Unreal Engine 5.1 300 is illustrated by a screen shot, as shown. Of course, Unreal Engine is simply one example, and it is not intended that claimed subject matter be limited in scope to Unreal Engine software.

Unreal Engine 5 was revealed on May 13, 2020 by Epic Games. It was released in early access on May 26, 2021, and formally launched for developers on Apr. 5, 2022. One of its major features is Nanite, an engine that allows for detailed photographic source material to be imported into games.

The goal of Unreal Engine 5 was to make it as easy as possible for game developers to create detailed game worlds without having to spend excessive time on creating new detailed assets. Among its features are collision detection, colored lighting, and texture filtering. An integrated level editor, UnrealEd, that has support for real-time constructive solid geometry operations, allows mappers to change the level layout on the fly.

Nanite can import nearly any other pre-existing three-dimensional representation of objects and environments, enabling the use of film-quality assets. Nanite automatically handles the levels of detail (LODs) of these imported objects appropriate to the target platform and draw distance, a task that an artist would have had to perform otherwise. Lumen is another component described as a "fully dynamic global illumination solution that immediately reacts to scene and light changes". Lumen eliminates the need for artists and/or developers to craft a lightmap for a given scene, but instead calculates light reflections and shadows on the fly, thus allowing for real-time behavior of light sources. Virtual Shadow Maps is another component added in Unreal Engine 5 described as "a new shadow mapping method used to deliver consistent, high-resolution shadowing that works with film-quality assets and large, dynamically lit open worlds". Virtual Shadow Maps differs from the common shadow map implementation in its extremely high resolution, more detailed shadows, and the lack of shadows popping in and out which can be found in the more common shadow map technique due to shadow cascades. Additional components include Niagara for fluid and particle dynamics and Chaos for a physics engine. With potentially tens of billions of polygons present on a single screen at 4K resolution, Epic also developed the Unreal Engine 5 to take advantage of the upcoming high-speed storage solutions with next-generation console hardware expected to use a mix of RAM and custom solid-state drives.

A version of Unreal Engine, Unreal Engine 5.1, is currently available. Thus, executing on a computing device, such as 204, which may, as described, comprise a platform with one or more state of the art GPUs and CPUs, or which may comprise a virtual machine (VM), executing on one or more servers, such as via AWS or Microsoft Azure, an immersive, photorealistic, virtual three-dimensional gaming environment is able to be computer generated. Other examples of computer-generated virtual 3D gaming environments are provided in U.S. Pat. No. 8,384,710, titled "Displaying and Using 3D graphics On Multiple Displays Provided for Gaming Environments," issued to Schlottmann, et. al., on Feb. 26, 2013; U.S. Pat. No. 10,846,937, titled "Three-Dimensional Virtual Environment," issued to Rogers et. al., on Nov. 24, 2020; and U.S. Pat. No. 11,471, 775, titled "System and Method for Providing a Computer-Generated Environment," issued to Benzies, on Oct. 18, 2022.

Figure 4:
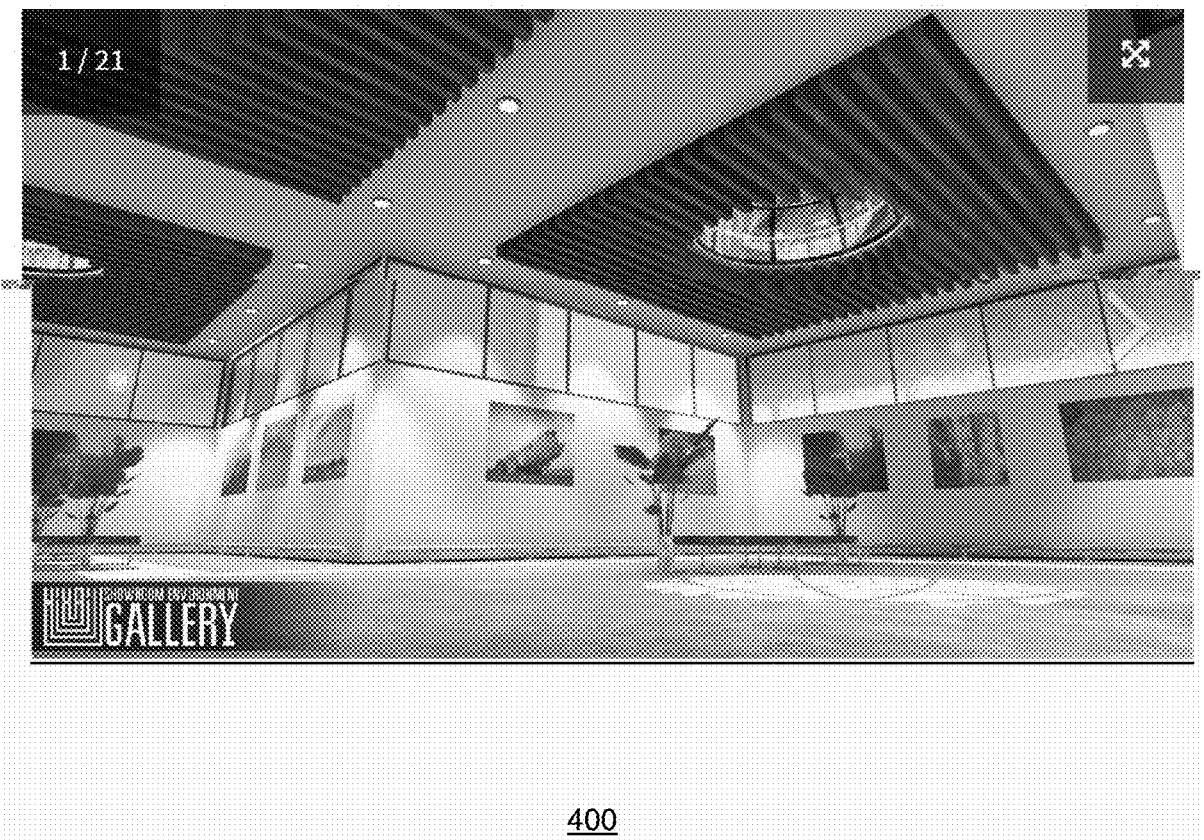
FIG. 4 is a window Illustrating an image of a typical 3D model capable of being rendered, such as by Unreal Engine 5.1, for example.

Likewise, a host of three-dimensional models are available or may be created that are able to be rendered on a computing device, such 204. Unreal Engine 5.1 is an example of software to computer generate a 3D model. Thus, for example, a 3D model for a museum walk through may be computer generated. A screen shot illustrating one embodiment, 400, is provided in FIG. 4. This three-dimensional model, for example, is available for purchase at Buy Professional 3D Models|CGTrader, https://www.cgtrader.com/3d-models. Of course, claimed subject matter is not intended to be limited to any particular 3D model.

However, continuing with this illustrative example, A museum walk through 3D model may, in an embodiment, include many three-dimensional (3D) virtual displays, as illustrated in embodiment 100 of FIG. 1. FIG. 1 is an illustration of a 3D model 100 capable of being computer generated with Unreal Engine 5.1, for example. FIG. 1 shows, for embodiment 100, an Unreal Engine window in which the 3D model is being at least partially rendered so that the 3D model may be edited. It is noted that windows provided in the figures depict example embodiments, and are generated from a full high definition window of 1920×1080 pixels. However, the windows providing example embodiments are sized down to fit within standard borders, such as those in the computer application, Word. Thus, it is noted, that some resolution (e.g., detail) may be lost as a result of this resizing.

Thus, in FIG. 1, the illustration of embodiment 100 includes an editor window 110, which represents execution of Unreal Engine 5.1 so that the 3D model that is to be rendered may be edited. For example, window 115 partially illustrates the 3D model being rendered, but in a manner so that within window 115, a user, for example, may be able to perform edits to the particular 3D model. Partially rendered window 115 includes, as shown, people 125, benches 130, sculptures 140, and/or other items to create an immersive, photorealistic museum-type three-dimensional (3D) gaming environment.

Likewise, 110 depicts many 3D virtual displays or virtual screens within the 3D model, such as 3D virtual display 120, which, after being rendered, becomes a part of the computer-generated 3D gaming environment. As shown, there are many 3D virtual displays illustrated in FIG. 1. These 3D virtual displays may be arranged in a chosen configuration within the 3D gaming environment in an embodiment, as illustrated.

In this example, the configuration attempts to simulate a real world environment, here, a museum-type walk through environment, with a virtual 3D gaming environment. Hence, many more 3D virtual displays may be included that are not depicted in FIG. 1. That is, due to the three-dimensional nature of the gaming environment created, for an embodiment, a user may be able to virtually navigate between and/or among the 3D virtual displays, including some not shown by FIG. 1. Therefore, in one embodiment, as described below in more detail, a user may be able to virtually navigate between and/or among many 3D virtual displays.

For one embodiment, virtual navigation might be accomplished with a mouse, for example, in which moving the mouse may result in virtual movement within the 3D gaming environment. Likewise, a mouse, again, merely as an example, may permit zooming in and/or zooming out, perhaps via scrolling, for example. Again, these are merely illustrative examples. However, there are a number of other modes of navigation that may be provided as well, as described in more detail below. As simply one example of another mode of navigation, a path of virtual navigation for a user may be created during the editing process, such as one intended to virtually and smoothly navigate the user between different 3D virtual displays in a particular order, for example. In this mode, for example, once or after a particular 3D display is reached via virtual navigation along a preset path, perhaps, via a mouse click, a keyboard key, or some other actuation of some other input device, virtual navigation may be paused in front of a particular 3D display, but virtual navigation to the next 3D virtual display of the preset path may be resumed as well via a similar type of actuation via an input device.

Figure 9:
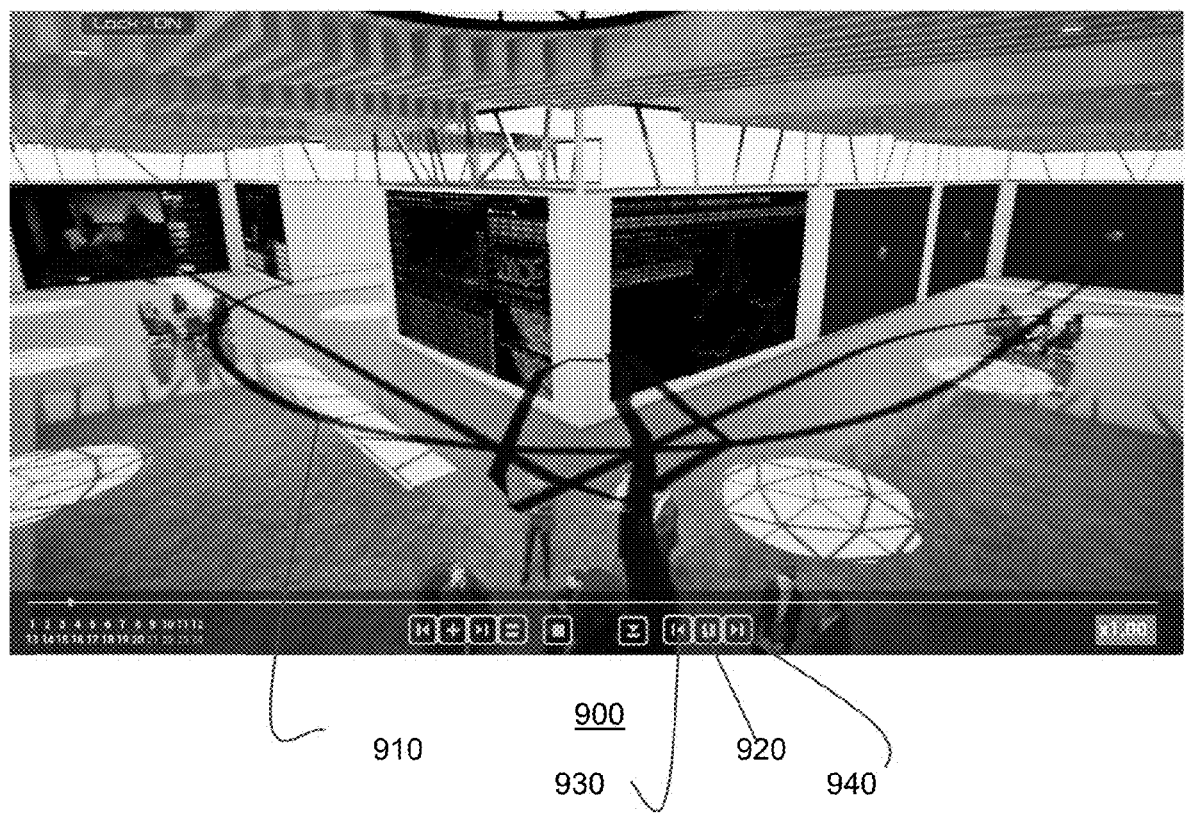
Figure 14:
FIG. 14. is a window illustrating an embodiment of a computer-generated three-dimensional (3D) gaming environment that includes one or more 3D virtual displays to provide real-time visualizations of web browser derived content in accordance with claimed subject matter.

FIG. 9, for example, illustrates a window that includes a ribbon path 910, depicting a preset path, for an embodiment 900 of a computer-generated 3D gaming environment, as has been described. It is noted that during virtual navigation, the path 910 would not be shown to a user. Embodiment 900 likewise includes, as an example, controls shown along with the 3D virtual display itself, similar to the type of controls often seen in connection with a YouTube video player or the like. A ribbon path and controls for virtual navigation are also illustrated by FIG. 14. In FIG. 9, for example, a pause button 920 is shown, as is a reverse button 930 to move to a prior 3D virtual display and a forward/resume button 940 to move to a next 3D virtual display. Other controls may also be present in this embodiment, described more below, which may involve "jumps" and/or "teleports," for example, within the 3D gaming environment. In this manner, in an embodiment, an immersive, photorealistic, and virtually navigable, three-dimensional gaming environment is able to be computer-generated. As mentioned, the additional buttons may permit additional operations associated with the preset path, such as a "jump" or "teleport" to a prior or later 3D virtual display along the preset path, described in more detail below. It is noted, however, that, again, this is merely an illustration of an embodiment of claimed subject matter.

Continuing with embodiment 100, illustrated in FIG. 1, once or after the 3D model is edited and complete, it may be rendered by executing Unreal Engine 5.1, for example. Once or after being rendered, a user, sometimes described as a first person in a game, as suggested above, in a "play" virtual navigation mode, would be able to virtually navigate within the 3D gaming environment to move among and/or between different virtual 3D displays. Again, in one particular virtual navigation mode, for example, this may be done via a mouse and/or similar input device.

Thus, in accordance with claimed subject matter, a three-dimensional gaming environment may be computer-generated, such as on a virtual reality simulation device. Furthermore, a number of three-dimensional virtual displays, such as from three up to hundreds, to pick an arbitrary example, without intending to limit claimed subject matter, may be computer-generated to be arranged in a configuration within the 3D gaming environment so as to be able to virtually 3D navigate in a manner between and/or among the 3D virtual displays computer-generated (and/or to be computer-generated) by the virtual reality simulation device.

For the purposes of this patent application, a "virtual reality simulation device" refers to any device or set of devices able to render and, therefore, display a three-dimensional gaming environment. Thus, typically, a computing device and/or computing system, with a suitable manner of displaying visual content in three-dimensions, comprises an example of a virtual reality simulation device. However, it may include many other devices, as well, including, as examples, but without limitation, tablets, smart phones, labtops, high resolution 2D computer displays, mobile smartphones, HDTV, video projectors, current and/or next generation virtual reality (VR), augmented reality (AR), mixed reality (MR), and/or "xtended" reality (XR) googles and/or glasses, or any combinations of the foregoing. For example, in many instances, a display device, such as a high resolution 2D computer display or virtual reality glasses or goggles, may be able to connect or couple to a computing device, for example, such as via a wired or wireless connection, to result in a "virtual reality simulation device."

Furthermore, in an embodiment, the 3D virtual displays may be populated with web browser derived real-time content. In general, "web browser derived real-time content" refers to content that is derived or produced by real-time execution of a web-browser. As examples, this may include content computer-generated within and/or derived from a web browser being executed in real-time, such as computer-generated content, as examples, but without limitation, in the form of at least one of web pages, images, video, slides, electronic documents, electronic spreadsheets, graphical displays or any combinations thereof. Claimed subject matter, such as "web browser derived real-time content" is not restricted in scope to any particular type of computer-generated content and/or to any particular web browser. A variety of web browsers exist and may be sufficient; however, one example, without limitation, is a Google Chrome web browser. Another example, without limitation, is an Oculus web browser.

Continuing with discussion of the present embodiment, 3D virtual displays are able to be populated from a web browser via execution by Unreal Engine of a "blueprint script." The blueprint visual scripting system, for example, in Unreal Engine is a complete gameplay scripting system based on the concept of using a node-based interface to create gameplay elements from within the Unreal Editor. See, for example, "Introduction to Blueprints," https://docs.unrealengine.com/4.27/en-US/ProgrammingAnd-Scripting/Blueprints/GettingStarted/#:~:text=The%20Blueprint%20Visual%20Scripting%20system, or%20objects%20in%20the%20engine. The blueprint visual scripts translate to executable C++ code. This system is, in some ways, perhaps, similar to Javascript and/or HTML5. Thus, as with these former scripting languages, one is able to write code to be executed that may be employed to generate a web browser. See, for example, https://blogs-.windows.com/msedgedev/2015/08/27/creating-your-own-browser-with-html-and-javascript/. Likewise, Unreal Engine, executes the blueprints written for the blueprint visual scripting system, which executes the associated C++ code to generate a web browser, in this example. See WebBrowser Unreal Engine Documentation, https://docs.unrealengine.com/5.0/en-US/API/Runtime/Web-Browser/. See also Customizing the Player Web Page Unreal Engine4.27Documentation,https://docs.unrealengine.com/4.27/enUS/SharingAndRelea sing/PixelStreaming/Custom-Player/. However, again, as mentioned, claimed subject matter is not limited in scope to employing Unreal Engine. Rather, it is provided as an illustrative example.

Therefore, as suggested, the 3D virtual displays may be populated with web browser derived real-time content. Again, this may include, as examples, content computer-generated within and/or derived from the execution of a web browser, such as computer-generated content, as examples, but without limitation, in the form of at least one of: web pages, images, video, slides, electronic documents, electronic spreadsheets, graphical displays, or any combinations thereof.

Figure 5:
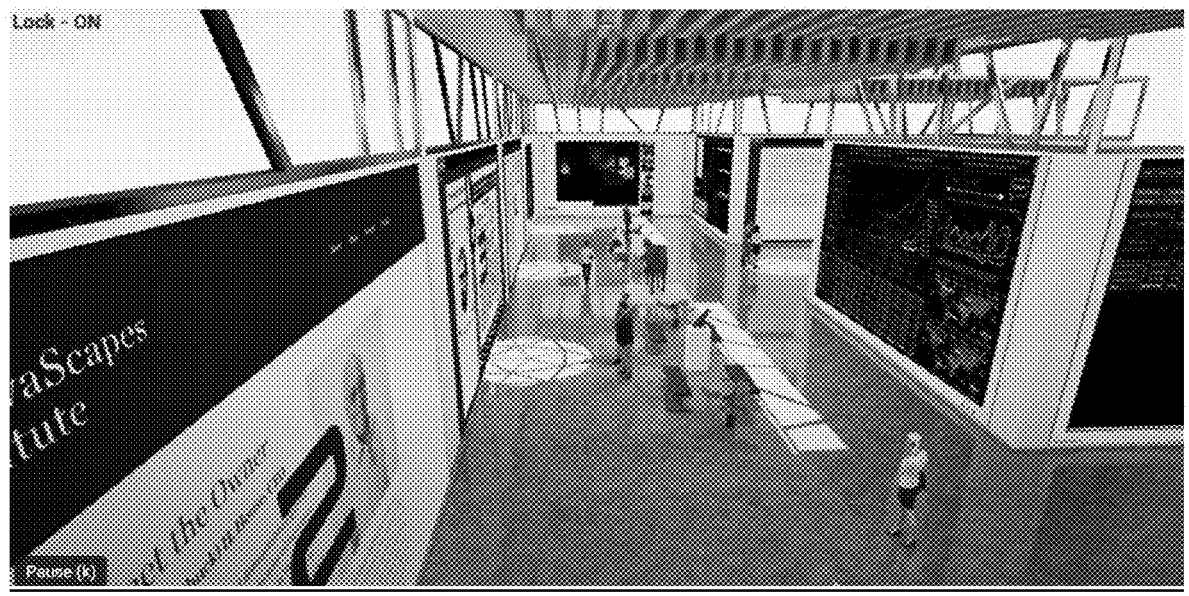
FIGS. 5-11 are windows illustrating embodiments of a computer-generated three-dimensional (3D) gaming environment that includes one or more 3D virtual displays to provide real-time visualizations of web browser derived content in accordance with claimed subject matter.
Figure 6:
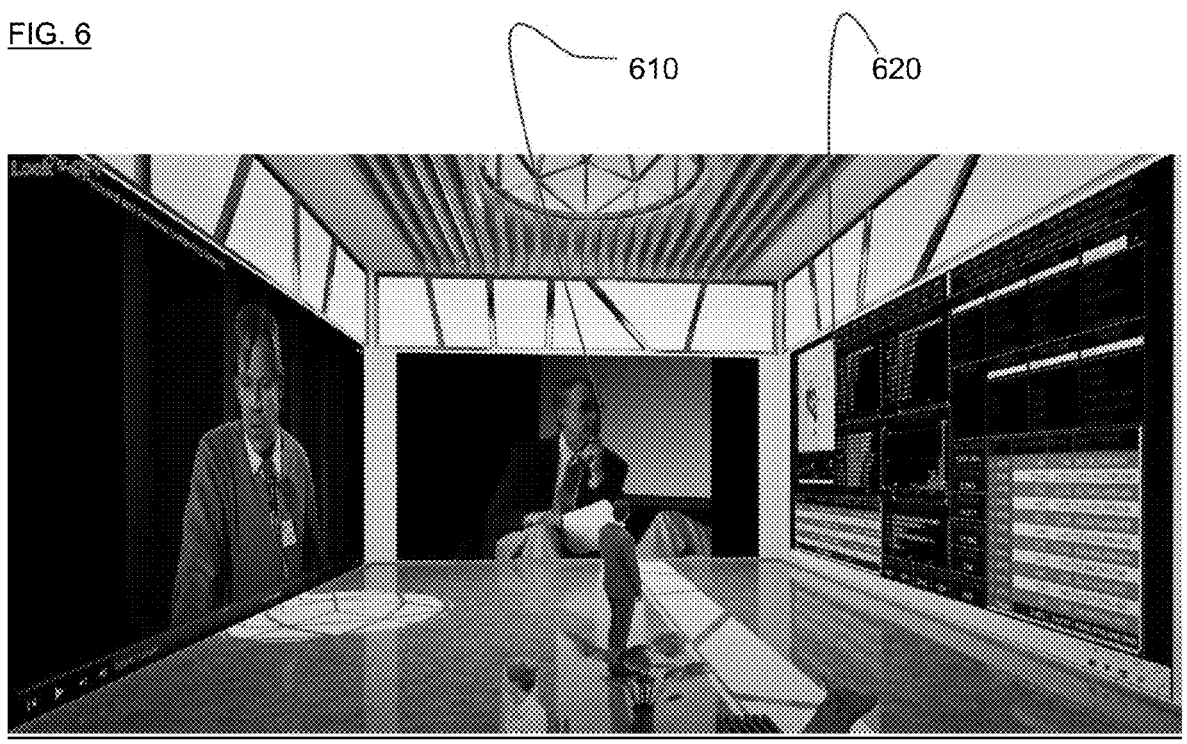
Figure 7:
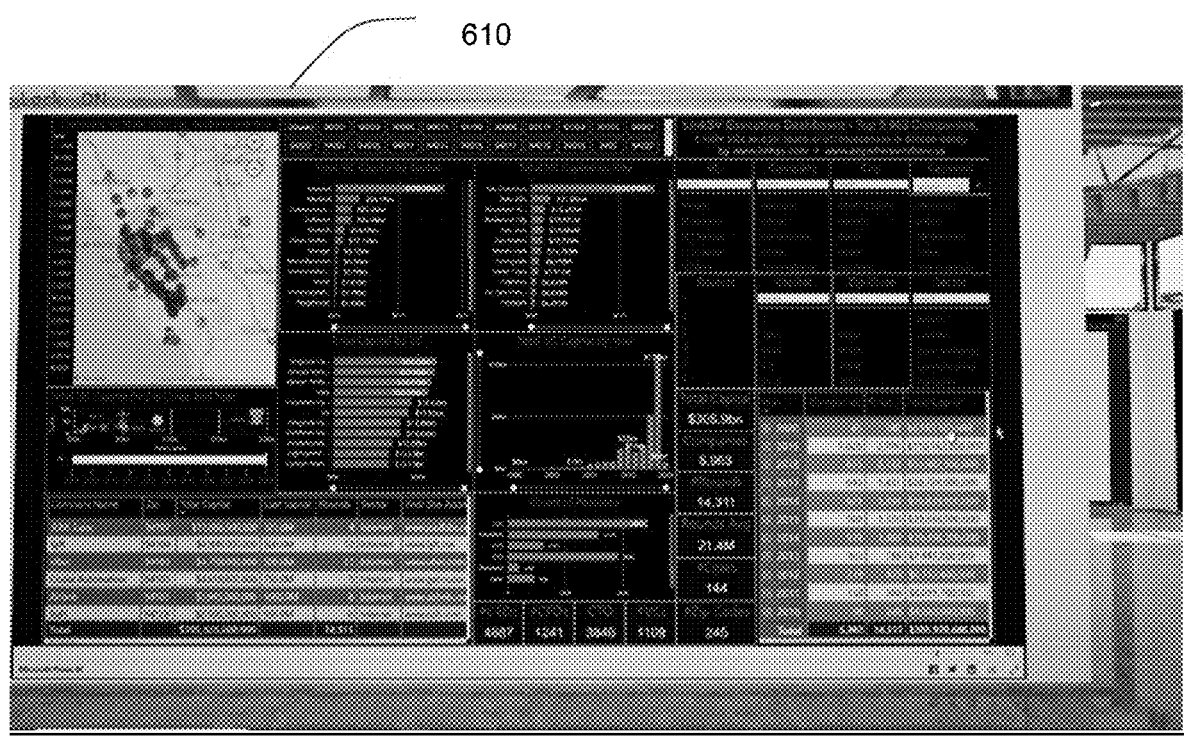
Figure 8:
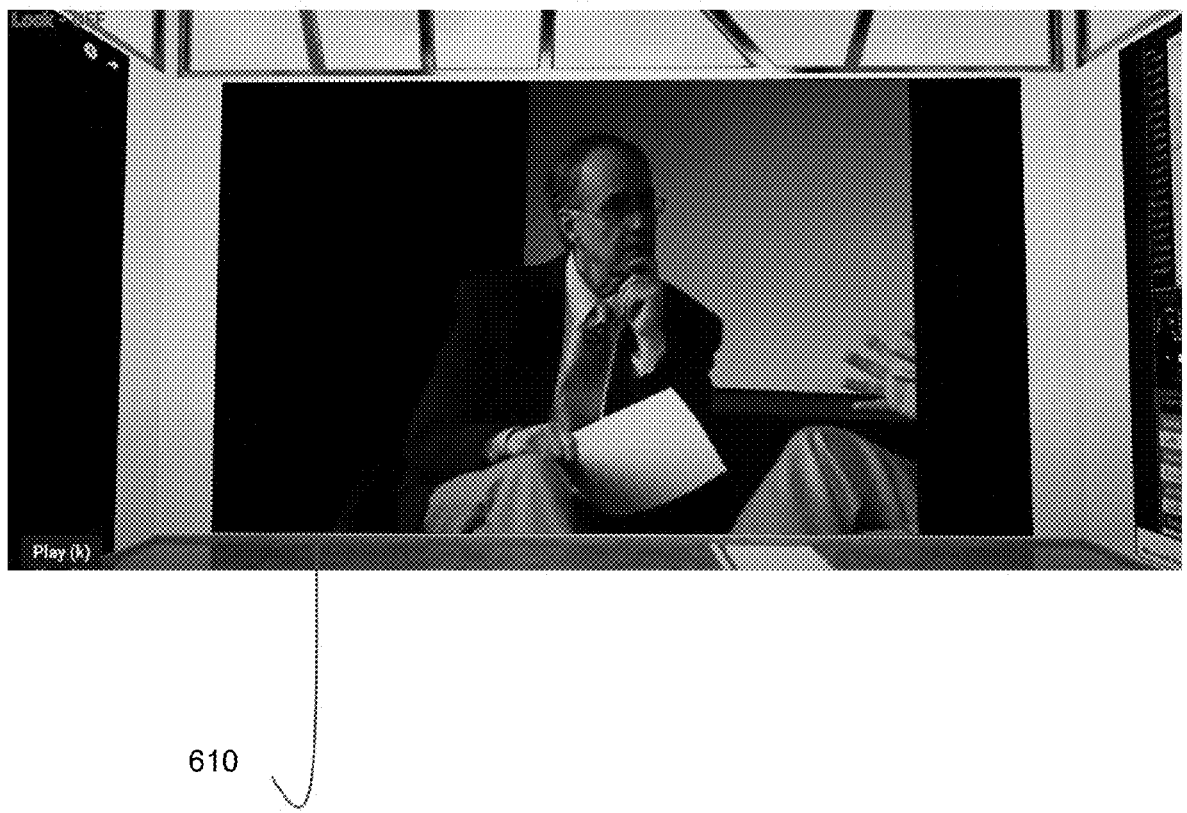

Referring to FIGS. 5 and 6, for example, these figures illustrate windows of an embodiment of a virtual 3D gaming environment, like the embodiment illustrated in FIG. 1. Thus, embodiment 500 of FIG. 5 and embodiment 600 of FIG. 6 illustrate, for an embodiment, the ability to virtually navigate within the virtual 3D gaming environment between and/or among various 3D virtual displays, since the computer-generated views being shown are different between the two figures, but both relate to the museum-like 3D gaming environment, discussed above. Furthermore, in FIG. 6, for example, it is illustrated that 3D virtual displays 610 and 620 have been populated with web browser derived real-time content. For example, as shown in FIG. 7 more clearly, 3D virtual display 610 has been populated with a video able to be shown as it is played in real-time within the 3D gaming environment. Likewise, as shown in FIG. 8, 3D virtual display 620 has been populated with graphics that provide real-time content, in this example, about a set of companies of interest. Thus, virtual 3D display 620 in FIGS. 6 and 8, for example, has been populated with a real-time visualization of real-time signal information, for example.

That is, for an embodiment, a web browser may be executed and may receive real-time signal information. That signal information may then be processed (e.g., 'sliced and diced'), for example, by the executing web browser and in real-time the processed signal information may be displayed within the web browser, which may be shown via a 3D virtual display, such as 620, within a 3D gaming environment. In this case, again, the real-time signal information provides content about a set of companies of interest. However, in another embodiment, for example, a 3D virtual display may show other real-world manifestations capable of being measured and/or reported in real-time, such as, without limit, temperature, pressure, voltage, current, electromagnetic radiation, and so on.

Thus, for an embodiment, such as depicted in FIGS. 5-8, a three-dimensional gaming environment may be computer generated so that 3D virtual displays within that environment are populated with web browser derived real-time content. Furthermore, the 3D virtual displays may be configured within the 3D gaming environment and may be populated with selected web browser derived real-time content so as to form a template for the display of and/or interaction with selected web browser derived real time content, via, for example, at least one virtual reality simulation device. In this context, the term template refers to at least a 3D virtual display in a 3D gaming environment and/or, perhaps, an arrangement of 3D virtual displays in a virtual configuration in a 3D gaming environment, that provides a layout or structure for the presentation of content, such as web browser derived real-time content. A template, such as for a 3D virtual display, for example, is analogous to a template slide in Power Point. However, in an embodiment, several 3D virtual display templates may be combined to also form a greater template. Likewise, in an embodiment, a greater template may include a particular 3D model that also includes the templated 3D virtual displays for populating web browser derived real-time content. For example, a template may be formed from a 3D model that has been further edited with layout and/or structure, for example, in one embodiment, in the form of specific modules for the respective 3D virtual displays, to provide a template that includes the overall layout and/or structure within a 3D gaming environment.

For example, for an embodiment, a web browser may be executed, such as on the same computing device, for example, such as computing device 204. In an embodiment, the web browser may be executing a computer program, such as an application. Again, simply as examples, the web browser may be executing software written in Java Script and HTML. As a result of executing the software, the web browser may computer generate the appropriate content and that content may then be rendered so that it is seen via a 3D virtual display, such as displays 610 and/or 620, within a 3D gaming environment, such as the museum-type 3D gaming environment, previously discussed and illustrated.

Of course, in another embodiment, the web browser may interact with another program executing elsewhere other than on the same computing device. For example, for another embodiment, a web browser may be executing, for example, such as on computing device 204, as before. However, that web browser may be operating as a client with respect to one or more servers executing a computer program elsewhere. Thus, rather than processing of signals and creating content within the web browser to then be rendered within a 3D gaming environment, instead, processing of signals and creation of content may occur on a remote server, such as computing device 206 or computing device 202 in FIG. 2, for example, in communication with computing device 204 via network 208. Content generated by a remote server, such as computing device 202, let's say, may then be transmitted to computing device 204, where it may then be rendered on a 3D virtual display within a 3D gaming environment being rendered on computing device 204.

Many third-party application programs operate this way. For example, one may create and then display PowerPoint slides using a web browser via the program PowerPoint, available from Microsoft Corp., in this manner. That is, the PowerPoint application may be executing on a remote server that is being accessed by a web browser operating on computing device 204, for example. Having created a PowerPoint slide deck in this manner, for example, a user may then display that deck within a 3D gaming environment on a 3D virtual display via transmissions from the remote server. In general, any functionality available via a web browser that results in text, images, video, audio, and/or other types of content to display within the web browser, as well, may be transmitted to a computing device, such as 204, to be computer generated on 3D virtual displays within a virtual 3D gaming environment, in this or in a similar manner. This includes a host of commonly used third-party computer program applications, including, without limitation: the Microsoft 365 Suite, including such computer program applications as Outlook, Word, PowerPoint, and Excel. Other Microsoft computer program applications include Visio, Power BI, OneNote, a Microsoft web-based virtual whiteboard computer program application, and a Microsoft Project Online computer program application, as a few examples. Such programs are available from Microsoft Corp., Redmond, WA. Other computer application programs that may generate web browser derived real-time content to display in a web browser, as examples, but without limitation, may include AutoCAD, available from Autodesk, Inc, San Rafael, CA; Kanban board computer programs and/or applications; CPM, PERT and/or Gantt chart computer programs and/or applications, as well as a variety of other web-based computer program applications, etc.

Typically, to accomplish results as just described will generally involve use of a high-end graphics computing platform of some type, such as previously described. For example, a computing device with a state-of-the-art GPU, such as the Nvidia RTX3070 GPU, available from Nvidia Corp., San Jose, CA, and a state-of-the-art CPU, such as the Intel Core i9 microprocessor, available from Intel Corp., San Jose, CA, may be employed. Alternatively, as suggested, this capability may be accomplished via a virtual machine (VM) available through a service, such as AWS or Microsoft Azure, as examples.

On the other hand, one benefit would be for a standard business laptop, such as one having an Intel Pentium, Intel Celeron, or Intel Core microprocessor with 8 GB of RAM, for example, to have the capability to generate similar results, such as those previously described, with a potentially smaller memory capability and/or a potentially lower processing power than a high-end graphics computing platform.

In an embodiment, to accomplish the foregoing, streaming, for example, may be employed, which may provide a benefit, such as permitting use of a standard business laptop, such as one having an Intel Pentium, Intel Celeron, or Intel Core microprocessor with 8 GB of RAM, for example, or, perhaps use of a similar computing device with similar capabilities. Furthermore, streaming may take place via a standard internet connection, such as one with a speed of about 3 to about 8 Mbps, as an example.

Many approaches to streaming are available and claimed subject matter is not limited to a particular approach. However, as illustrative examples, the white paper, "Streaming Unreal Content to Multiple Platforms," herein incorporated by reference in its entirety, discusses streaming via WebGL and/or HTML5. This white paper is available from Epic Games at chromeextension://efaidnbmnnnibp-cajpcglclefindmkaj/https://cdn2. unrealengine.com/Unreal+ Engine%2FPixelStreamingWhitepaper%2FPixelStreamingW hitepaper-V1.9C-ec1985a0f32c53c6650b2d02c11a67c32fa4e176.pdf.

WebGL is a cross-platform, royalty free open web standard for low level 3D graphics. HTML5, a version of HTML, discussed in more detail later, is a mark up language used in conjunction with creating web sites. Here, the terms "WebGL" and "HTML" are intended to refer to any prior versions and/or any versions to be developed later of WebGL and HTML. Either and/or both of these may be employed to stream content across a network, such as the Internet.

Likewise, Epic Games has a streaming approach it refers to as "pixel streaming." "Pixel streaming" is explained in the aforementioned white paper, titled, "Streaming Unreal Content to Multiple Platforms." If using Unreal Engine, such as Unreal Engine 5.1, then streaming may be implemented via pixel streaming, if desired. Thus, Unreal Engine 5.1, in addition to features previously discussed, also makes available the ability to pixel stream across a network. However, again, claimed subject matter is not limited in scope to Unreal Engine or to employing pixel streaming. Rather, there are provided as illustrative examples.

Continuing, however, there are certain underlying technologies that, in an embodiment, may work together to deliver desirable results, which may include real-time ray tracing, such as has been made possible by Nvidia Corp., see https://developer.nvidia.com/rtx/ray-tracing, and streaming technology, such as has been made possible by HTML5, WebGL and/or pixel streaming technology, provided as a few illustrative examples For example, real-time ray tracing makes possible the creation of an immersive, photorealistic 3D gaming environment "on the fly," so to speak. Thus, as a user navigates between and/or among 3D virtual displays, the visual presentation, though changing in real-time, may be successfully rendered. This also may permit the rendering, for example, of multiple 3D virtual displays at once or in succession, such via "jump" or "teleport" virtual navigation modes between and/or among 3D virtual displays, described in more detail below. Therefore, a user employing a mode of virtual navigation, in an embodiment, may more easily digest large amounts of real-time delivered signal information quickly. It is also noted that in another virtual navigation mode, virtual movement between 3D virtual displays, rather than appearing as a "jump" or "teleport," may also be rendered as smooth virtual movement within the 3D gaming environment from one 3D virtual display to another.

Furthermore, real-time ray tracing also permits real-time updating to be displayed, for example, through visualization. Illustrative examples of many types of visualizations are included in the D3 gallery at https://observablehq.com/@d3/gallery. With real-time visualizations, changes, especially significant changes, may be easier to recognize, than may occur with merely reporting of updates, for example, in text, in which changes, including significant ones, may be more likely to be overlooked. Virtual navigating with real-time ray tracing, is illustrated, for example, by FIGS. 5, 6, and 7, showing example embodiments in which a user has virtually navigated to and/or between views that include a variety of 3D virtual displays. For example, in such a manner, a user is able to ultimately settle on a particular 3D virtual display providing real-time signal information of interest, such as shown in FIG. 7.

However, in addition to this capability, these results are able to be delivered without a high-end graphics platform in the immediate physical vicinity of the user. Through use of streaming technology, for example, the results illustrated by the embodiments of FIGS. 5, 6, and 7 may be delivered via a standard internet connection, such as an internet connection with a speed of from about 3 to about 8 Mbps, delivering content to a standard business laptop or similar computing device with similar capabilities, such as one having an Intel Pentium, Intel Celeron or Intel Core microprocessor with 8 GB of RAM, as an example. In a sense, one may view the results produced by a service, such as available from AWS or Azure, as providing a virtual machine, for example, to, in effect, be a "broadcast" delivered over a network, such as the internet, via streaming, to be received by a conventional laptop (e.g., standard business laptop or desktop), or a similar computing device with similar capabilities.

Figure 23:

For purposes of comparison, FIGS. 5 and 6 illustrate embodiments 500 and 600, respectively, in which a three-dimensional gaming environment is generated without streaming and FIG. 23 illustrates an embodiment 2300 in which a three-dimensional gaming environment is generated with streaming. From visual inspection, the quality of the renderings is essentially equivalent.

In terms of a 3D gaming environment, a user may be viewed as a player, often termed a "first person." This refers to the user who would then be navigating between and/or among 3D virtual displays and also be interacting with the 3D virtual display(s) to affect the content shown or displayed, as illustrated and discussed with respect to FIG. 9 above, as one example. Consequently, within a 3D gaming environment, 3D virtual displays may be arranged in a particular configuration and selected 3D virtual displays may be populated with selected web browser derived real-time content so as to form a template for the display of and/or interaction with web browser derived real-time content. It is noted, for an embodiment using Unreal Engine, as an example, a "blueprint script" of the blueprint visual scripting system, for example, may be employed to form such templates, perhaps with a particular 3D model, depending on the particular template.

Likewise, in an embodiment, 3D virtual displays within the 3D gaming environment may be arranged in a configuration within the 3D gaming environment so that web browser derived real-time content may be selectable by the "first person" user for display within the template on selected 3D virtual display(s) within the computer-generated gaming environment. However, in addition to accomplishing this mode of user operation through physical operation of a high-end graphics platform, which, for example, might be computing device 204, as an alternative, via use of streaming technology, as was described, this may also be accomplished by a first person user at a standard business laptop using a standard internet connection, such as with a connection speed of about 3 to about 8 Mbps, as an example.

An embodiment, may, for example, via streaming, and/or through another transmission type mechanism, permit conversing (and/or perhaps even texting) between the first person user and one or more third person users, as an example. Likewise, "first person" user status may be transferred to a selected "third person" user so that the previous user with "first person" status becomes a "third person" user. Consequently, the selected "third person" user that acquired "first person" status may affect and/or interact with the content and/or the 3D virtual displays so that ultimately real-time collaboration between users may result. In one embodiment, simply by interacting with the content and/or the 3D virtual displays, "first person" status may be passed from the "first person" user to the "third person" user that attempted to interact with the content and/or 3D virtual displays. Thus, for example, in such an embodiment, "first person" status may be passed back by having the now "third person" user who had previously been the "first person" user then interact with the content and/or 3D display to regain "first person" status as a user. Likewise, in an embodiment in which there are multiple "third person" users, "first person" status may be passed among those users by the users respectively interacting with the content and/or the 3D virtual displays.

In such an embodiment, furthermore, as suggested, real-time collaboration may also be a capability. That is, via streaming, in an embodiment, one or more other remote users may be able to observe (and, in an embodiment, hear related audio) in real-time for one or more selected 3D virtual displays within the 3D gaming environment, including any interactions being executed by a remote first-person user. These one or more other remote users, again, may be referred to as "third person" users. Consequently, for an embodiment, within a chosen 3D model able to be rendered to computer generate a 3D gaming environment, a "first person" user may be able to at least partially control a wide variety of content to be presented, so to speak, in which selected content may appear on selected 3D virtual displays within a created template, for example, and in which that content may be back fed over a standard internet connection, such as, for example, from one or more cloud-based servers. The possibilities for content delivery, for example, as a result, become greater. For example, if an embodiment employs a virtual machine implementation, as suggested, such as may be implemented via AWS or Azure, for example, almost any content capable of presentation in a web browser, in an embodiment, may be auto-scaled for presentation via 3D virtual display. Likewise, the computer-generated 3D gaming environment presenting such content may be globally connected, such as via the Internet. Hence, a "first person" user in such an embodiment, may collaborate with one or more other "third" person users to affect and/or modify web browser derived real-time content appearing on one or more 3D virtual displays with a 3D gaming environment.

Figure 10:

Suppose a template, as one example, included only ten to twenty 3D virtual displays, since many more are possible. Conventionally, for a user to view such content this might have required a user to separately view 10 to 20 web pages or, perhaps, 10 to 20 thumbnails on a single screen. Instead, however, in an embodiment, a virtual user/viewer may be placed into a fully immersive, photorealistic, real-time ray traced 3D gaming environment. Similar to first person shooter games, instead of hunting and shooting bad buys and zombies, a virtual first person user may navigate and "hunt down" visually rendered signal information being processed in real-time and computer generated within a virtually navigable 3D gaming environment. An embodiment may provide up close and personal 3D virtual displays along with also having computer generated reusable templated views of clusters of 3D virtual displays, one example being illustrated by embodiment 1000 of FIG. 10, a corner shot of many 3D virtual displays. Furthermore, as described in more detail below, a user may interact with a 3D virtual display whether it appears to the user as shown in FIG. 7 or whether it appears to the user as shown in FIG. 10. That is, any 3D virtual displays that may have been rendered may be available for user interaction. It is additional noted that embodiment 1000 also includes 3D virtual display numbers appearing along with content on the 3D virtual displays to identify particular 3D virtual displays that have rendered computer generated content. This feature is discussed below in connection with FIG. 13.

Figure 11:
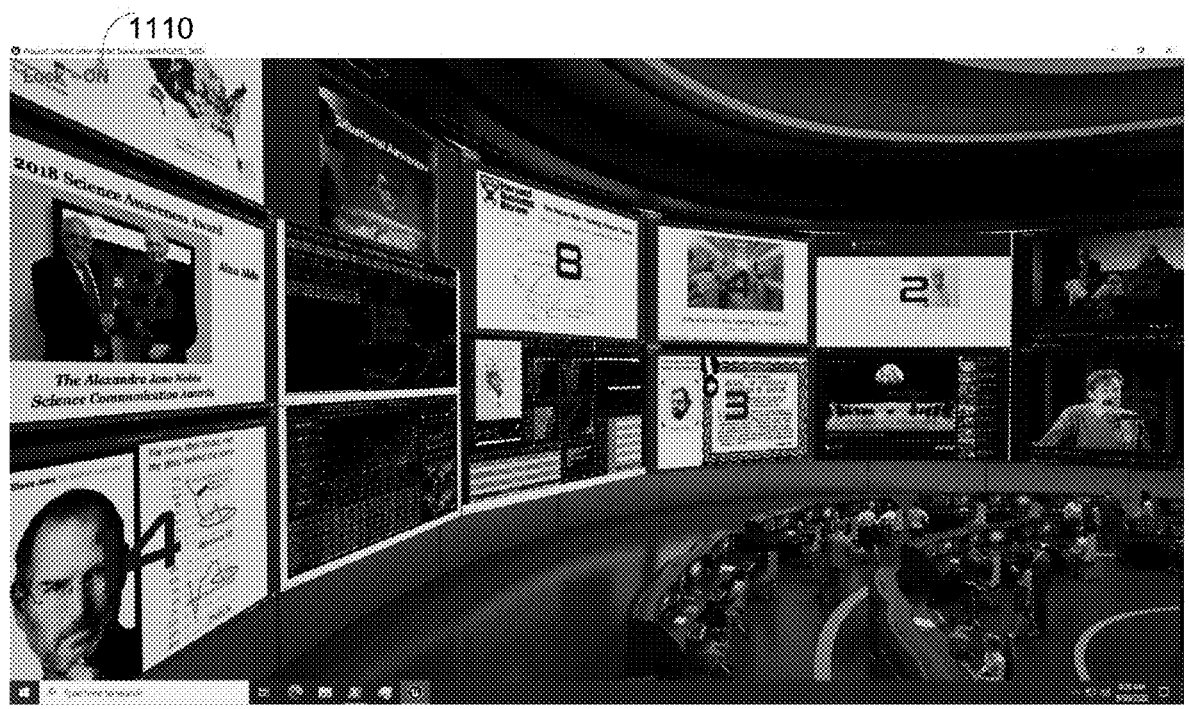
Figure 12:
FIG. 12 is a picture illustration of the Network Operations Center (NOC) for AT&T Corp.
Figure 24:
Figure 25:
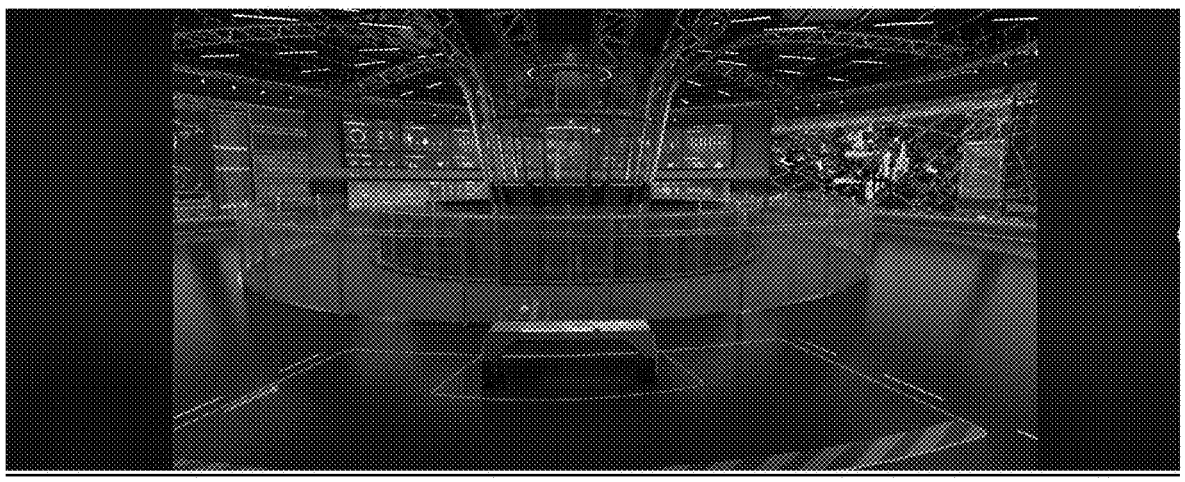

Another example might include ten to twenty, or even more, simultaneously observable 3D substantially rectangular virtual displays within the 3D gaming environment arranged in a "mission" control type (e.g., control room type) configuration within the 3D gaming environment, similar to the embodiment, 1100, shown in FIG. 11. This might, for example, be compared with illustration 1200 of FIG. 12, which shows the global network operations center (NOC) for AT&T Corp. A NOC of this magnitude must have cost literally a mountain of money to create and may have taken many months to years to design, build, test, make operational, maintain, upgrade, etc., unlike embodiment 1100 of a 3D gaming environment, as illustrated in FIG. 11. It is noted that another example embodiment showing a control room type configuration with a host of 3D virtual displays that render web browser derived real-time content is illustrated by FIG. 24. In an embodiment, these may be referred to as "dioramas," referring to computer generation of a host of 3D virtual displays in a gaming environment shown in a control room type configuration. Similarly, FIG. 25 illustrates a cyclorama, which, for an embodiment, may refer to computer generation of a host of 3D virtual displays in a gaming environment shown in a 360-degree configuration of 3D virtual displays, as illustrated in FIG. 25. Thus, as shown, a host of 3D virtual displays that computer generate web browser derived real-time content is illustrated.

Furthermore, in an embodiment, multiple "third person" users may also be able to nearly simultaneously observe, via a standard browser window, for example, an immersive, photorealistic viewable virtual 3D gaming environment with multiple 3D virtual displays. This virtual 3D gaming environment, in an embodiment, may be computer generated for display on a computer screen by a standard business laptop, desktop and/or tablet in an embodiment, rather than, for example, using expensive and powerful gaming specific hardware.

It is, of course, known and accepted that the human brain processes visual content (e.g., provided in the form of visualizations) faster than content provided, for example, as text. See, for example Friendly, Michael, "A Brief History of Data Visualization," appearing in the *Handbook of Computational Statistics: Data Visualization*, published by Springer-Verlap, 2006; Few, Stephan, Chapter 35 "Data Visualization for Human Perception, the Encyclopedia of Human-Computer Interaction, $2^{nd}$ Edition, published by the Design Interaction Foundation, available at https://www.interaction-design.org/literature/book/the-encyclopedia-of-human-computer-interaction-2nd-ed; and Few, Stephan, "Tapping the Power of Visual Perception," dated September 4, 200, available at www.perceptualedge.com.

Stephan Few, for example, in his article "Tapping the Power of Visual Perception," quotes from Colin Ware's book, *Information Visualization: Perception for Design*, published by Academic Press, 2000:

"Why should we be interested in visualization? Because the human visual system is a pattern seeker of enormous power and subtlety. The eye and the visual cortex of the brain form a massively parallel processor that provides the highest-bandwidth channel into human cognitive centers. At higher levels of processing, perception and cognition are closely interrelated, which is the reason why the words "understanding" and "seeing" are synonymous. However, the visual system has its own rules. We can easily see patterns presented in certain ways, but if they are presented in other ways, they become invisible . . . . If we can understand how perception works, our knowledge can be translated into rules for displaying information. Following perception-based rules, we can present our data in such a way that the important and informative patterns stand out. If we disobey the rules, our data will be incomprehensible or misleading."

This power of visual perception may be at least one reason why a host of tools exist to assist in computer generating visualizations, such as those illustrated, for example, by a D3 gallery at https://observablehq.com/@d3/gallery. As only a few examples, these "tools" include well-known and well-used application programs, such as PowerPoint, Power BI, AutoCAD, and Visio. Power BI, for example, has been recognized as innovative by others expert in analytics and business intelligence platforms. See https://powerbi.microsoft-.com/en-us/blog/tag/gartner/.

In addition to visualization, another aspect, in an embodiment, relates to visualizations of real-time signal information. Hence, the most up-to-date signal information, in an embodiment, may be presented via visualizations. As was stated above, "[t]he eye and the visual cortex of the brain form a massively parallel processor that provides the highest-bandwidth channel into human cognitive centers." However, likewise, in an embodiment, not just "one brain," but, via a gaming environment, "many brains" may, in effect, be employed to digest real-time visualizations of the most up-to-date signal information relevant to a particular endeavor, for example.

Thus, for an embodiment, multiple 3D visual displays may present multiple visualizations of real-time signal information. In this manner, a host of perspectives of real-time signal information related to a host of functions and/or operations may be visualized by multiple users in an embodiment. Thus, in effect, multiple human brains may each apply their experience and/or expertise with respect to these multiple visualizations in a manner to provide insights and/or guidance to decision makers in the context of a particular project, and produce real-time collaboration for a host of purposes, including to address problems and/or potential problems, as examples. For an embodiment, this may involve, to provide only a few examples, factory process flows, manufacturing process flows, business process flows, and so on as non-limiting examples Previously, a few approaches to virtual navigating within the gaming environment between and/or among 3D virtual displays were mentioned. However, claimed subject matter is not limited in scope to those examples. Other modes and/or ways to navigate are intended to be included within the scope of claimed subject matter. It is noted, as previously discussed, for an embodiment using Unreal Engine, as an example, using a "blueprint script" of the blueprint visual scripting system, for example, various navigation modes, such as these examples, may be implemented.

Figure 13:
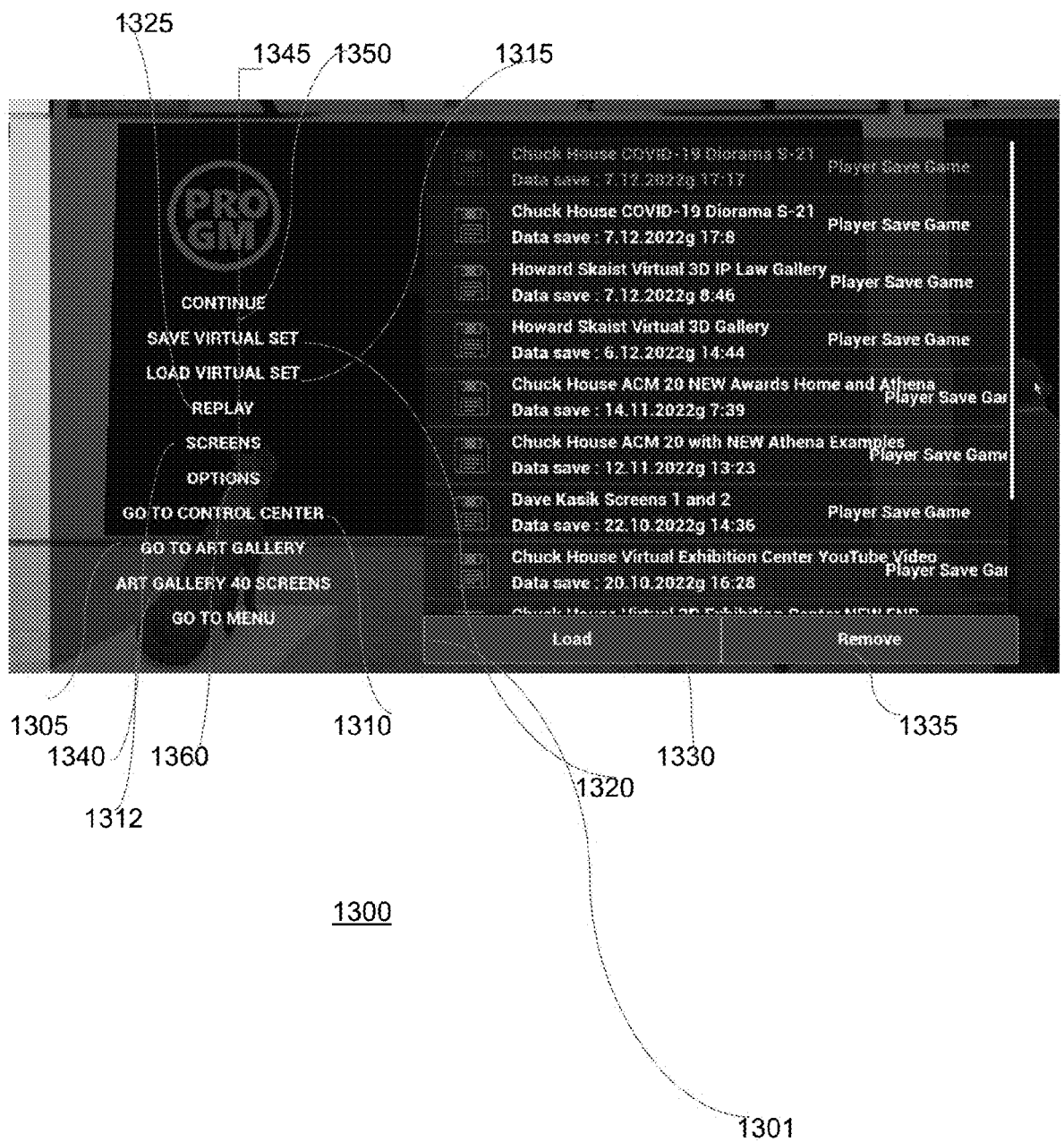
FIG. 13 is a window illustrating an embodiment of a selection menu for a computer-generated three-dimensional (3D) gaming environment that includes one or more 3D virtual displays to provide real-time visualizations of web browser derived content in accordance with claimed subject matter.

In an embodiment, at a more basic level, a menu of options may be shown, as illustrated by embodiment 1300 of FIG. 13. For example, a particular key stroke on a keyboard may signal to "bring up" (e.g., display) such a menu. As illustrated, a variety of choices may exist, although claimed subject matter is not limited to using a menu and/or to the choices available in this example illustration.

To make a gaming environment "active," so that it may be "played," in an embodiment, for example, one might select 1315, "load virtual set," which may refer to a particular 3D gaming environment in which selected content is included and arranged to appear on selected 3D virtual displays within the particular gaming environment. Thus, a "virtual set" refers to the 3D model, the templates and the content, which may all be loaded by "load virtual set," for example. In an embodiment, the arrangement of particular content assigned to appear on particular 3D virtual displays within the gaming environment may, in effect, be "pre-programmable," as discussed in more detail below. Thus, if a new particular arrangement of 3D virtual displays in a 3D model that also includes templates with particular real-time content to be shown on particular 3D displays has been, in effect, "programmed," that virtual set might also, in an embodiment, be saved via selecting 1320, "save virtual set."

However, continuing, after "load virtual set" is selected, an embodiment may be computer generated, such as, for example, where Unreal Engine may render a 3D gaming environment. As suggested, FIGS. 5 and 6, for example, illustrate rendering without streaming and FIG. 23 illustrates rendering with streaming. Thus, as suggested, a 3D gaming environment, in an embodiment, may open with a corner view in which multiple 3D virtual displays are visible, shown by embodiment 1000, as an example. Thus, selecting "load virtual set" might produce "play" mode, in an embodiment, in contrast with "replay" mode, discussed in more detail below.

In a "play" type mode, for example, as was previously suggested, virtual navigation might be accomplished with a mouse, in which moving the mouse results in virtual movement within the 3D gaming environment. Likewise, a mouse, again, merely as an example, may permit zooming in and zooming out, perhaps via scrolling, for example. Similarly, in "play" virtual navigation mode, selected keys may assist in virtual navigation, such as for "left," "right," "up," and/or "down." These may move a preset amount within the gaming environment in the directions indicated, resulting in re-rendering what may be displayed, for example. Again, there are merely illustrative examples.

Perhaps, continuing, via at least one of: mouse clicks, keyboard touch events, screen touch events, remote control actuation events, speaking events, or any combinations thereof, other ways of virtual navigation within the gaming environment may be realized. For example, perhaps a key stroke might "pull up" a navigation user interface (UI), as illustrated by embodiment 1600 of FIG. 16.

Figure 16:
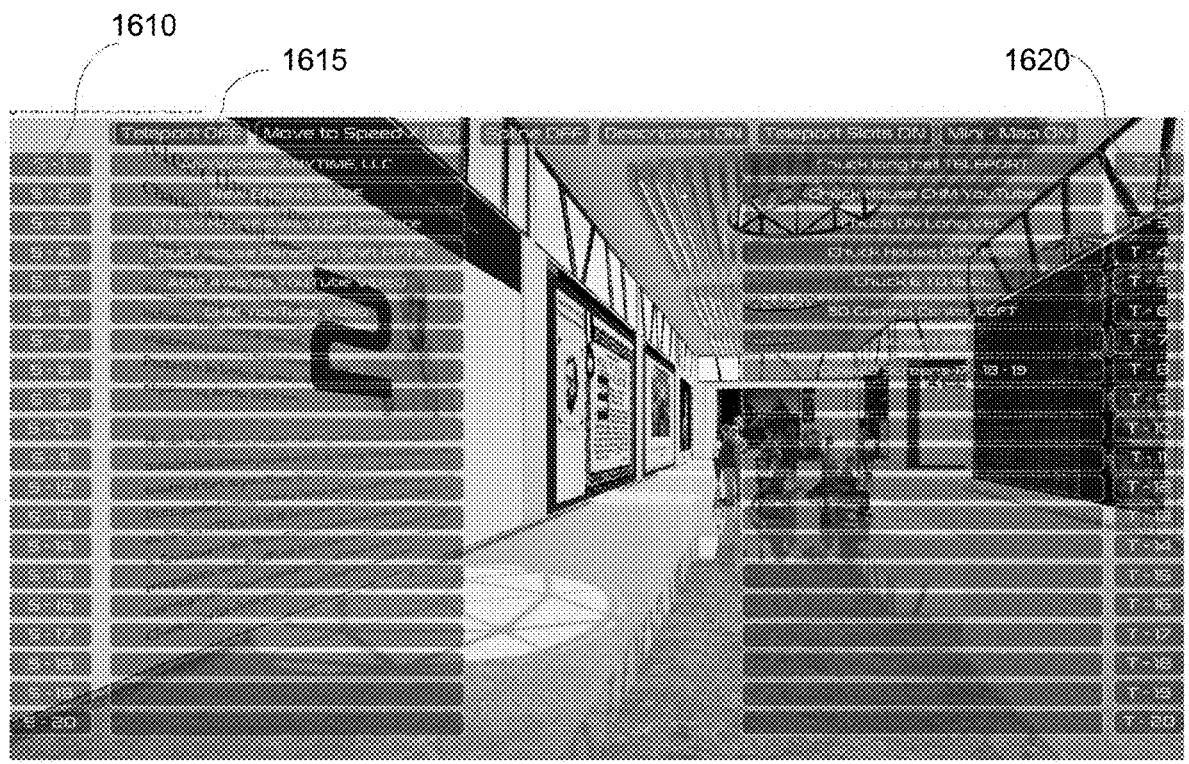
FIG. 16 is a window illustrating an embodiment of a virtual navigation user interface for a computer-generated three-dimensional (3D) gaming environment that includes one or more 3D virtual displays to provide real-time visualizations of web browser derived content in accordance with claimed subject matter.

Embodiment 1600 of FIG. 16 illustrates another example of a mode of virtual navigation for a 3D gaming environment. FIG. 16, for example, illustrates a user interface (UI) for virtual navigation. On the left side of the 3D virtual display, choices S-1, S-2, . . . . S-20, denoted 1610, are depicted. For an embodiment, via at least one of: mouse clicks, keyboard touch events, screen touch events, remote control actuation events, speaking events, or any combinations thereof, a choice may be selected. In this example, out of 20 3D virtual displays, selecting S-1, for example, in one virtual navigation mode, may computer generate on the user's screen smooth virtual movement within the 3D gaming environment, as if the user had virtually navigated to be in front of the 3D virtual display designated as "1." This may be referred to as a "teleport." Consequently, this virtual navigation mode, in an embodiment, may be referred to as "teleport" virtual navigation mode, and may be available, in an embodiment, if the 3D virtual display shows "teleport on." With "teleport off," for example, as shown in FIG. 16, virtual navigation to the 3D virtual display designated as "1" may be accomplished more as a type of "jump," in which the 3D virtual display may be rendered as if the user is immediately in front of that 3D virtual display. This, in an embodiment, may be referred to as "jump" virtual navigation mode. The other choices shown on the left-hand side may produce similar results for other 3D virtual displays. These choices may be referred to as specific "virtual display" jump or teleport choices, referred to with a "S" for an embodiment. The right hand side shows choices T-1, T-2, . . . . T-20, denoted 1620 in FIG. 16. These choices represent "pre-programed" locations or views within the 3D gaming environment. For example, selecting T-1, with "teleport off," as shown, may render a type of "jump," again, which may, in an embodiment, be referred to as "jump" virtual navigation mode, to a scene within the 3D gaming environment in front of a cluster of three specifically chosen 3D virtual displays in which the rendered real-time content of those 3D virtual displays is desired to be viewed by the user at the same time. Again, smooth movement to the particular scene, in an embodiment, may be referred to as a "teleport" and/or the virtual navigation mode may be referred to as "teleport" virtual navigation mode, and may result with "teleport on." The other choices, designed with a "T" represent other "pre-programmed" chosen locations or views within the gaming environment. To distinguish from specific "virtual display" jump or teleport choices, as discussed previously, in an embodiment, these choices may be referred to as "specific view"" jump or teleport choices. Of course, as previously described, for an embodiment, a user choice may be a smooth walk-through and/or fly-through from one 3D virtual display to another, such as described below with reference to FIG. 9 and path 920. The advantage of this navigation mode is that users can easily see other virtual displays and their numbers to visit later, in an embodiment, again, shown, for example, by FIG. 10. Furthermore, the selections across the top of the 3D virtual display, shown in FIG. 16, such as "spline off" or "move to speed×1.0," illustrate that virtual motion within the gaming environment might, in an embodiment, for example, have an adjustable speed and/or move along a path between 3D virtual displays taking a variety of shapes, such as nearly linear, spline-like, etc.

For an embodiment, virtual navigation between and/or among several or many 3D virtual displays is one perspective of navigation within a virtual world, here, a 3D gaming environment. However, typically once or after a user is positioned to a desired place within the gaming environment, often in front of a 3D virtual display, another type of virtual navigation may be understood as being available, a sort of virtual navigation with respect to the web browser derived real-time content of the 3D virtual display, also referred to as "user interaction", in this context. One possible example is illustrated as FIG. 9, as was discussed and/or FIG. 14. It is desirable for these just referenced two types of "virtual navigation" be performed separately and independently by a user, as described immediately below.

Figure 17:
FIGS. 17-25 are windows illustrating embodiments of a computer-generated three-dimensional (3D) gaming environment that includes one or more 3D virtual displays to provide real-time visualizations of web browser derived content in accordance with claimed subject matter.

In embodiments, as shown in FIGS. 9, 10 and 11, as examples, is a selection "lock-on," in the upper left hand corner, denoted by 1110 in FIG. 11. In an embodiment, for example, a lock may be toggled on and off for selection, via at least one of: mouse clicks, keyboard touch events, screen touch events, remote control actuation events, speaking events, or any combinations thereof, by a user, such as by selecting 1630. With "lock on" selected for virtual navigation mode, interaction with the particular 3D virtual display and its content may become enabled; whereas movement between 3D virtual displays may not be enabled. With "lock off" selected for virtual navigation mode, however, virtual navigation movement between and/or among 3D virtual displays may become enabled; whereas interaction with the content of the 3D virtual displays may not be enabled. For example, FIG. 17 shows "lock off" virtual navigation, in which movement "closer towards" a particular 3D virtual display is illustrated. For example, FIGS. 5 and 6, on the other hand, show "lock on" in the upper left hand corner, so that user interaction with the 3D virtual display and/or the content being displayed is enabled.

Thus, "lock off" virtual navigation may be a mode in which navigation between and//or among 3D virtual displays is able to take place, much as previously described. For "lock on" virtual navigation mode, interacting with the content of a 3D virtual display may be thought of as similar to interacting with a web page. For example, as shown in FIG. 9, a user may select 910, 920, or 930. Likewise, referring to FIGS. 18-22, mouse clicks or similar user actions with respect to the content (e.g., at various places on the 3D virtual display), as the content is being rendered in real-time, may result in rendering of different, but related, content on the particular 3D virtual display, such as, for example, a "multi-dimensional slice and dice" of the content being shown. This may include, as merely examples, rendering the content of a database providing the basis for visualization, rendering of a visual depiction of processing providing the basis for the visualization, rendering of another visualization of the content from a different perspective, rendering of other related content, etc.

Figure 18:
Figure 19:
Figure 20:
Figure 21:
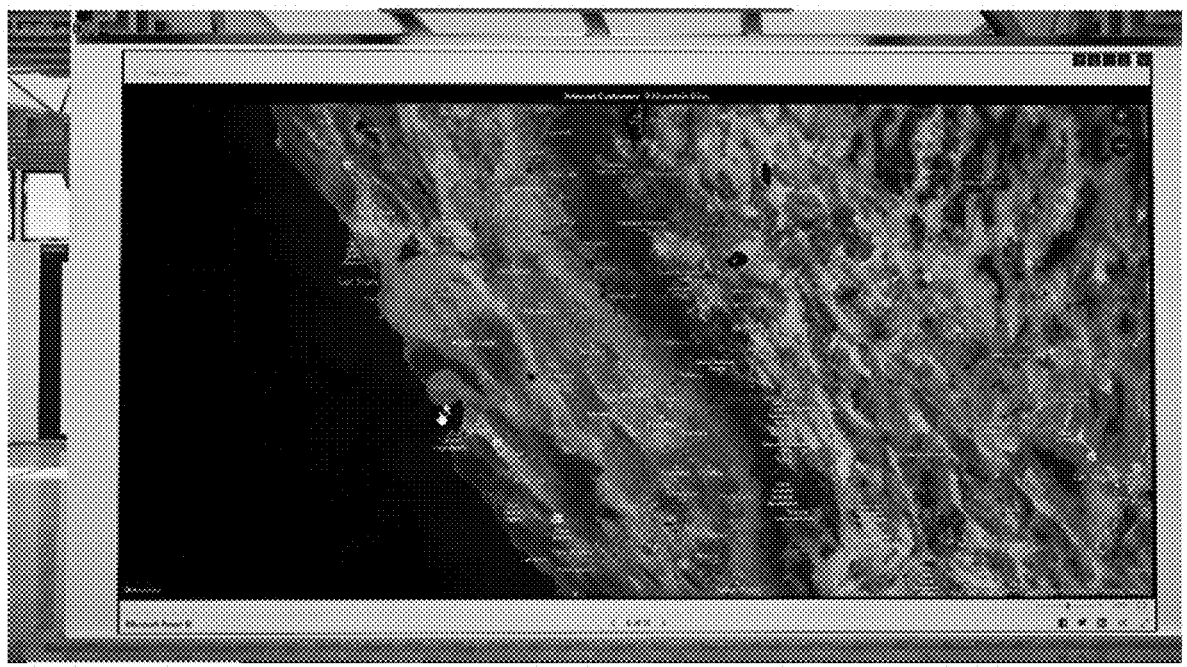
Figure 22:
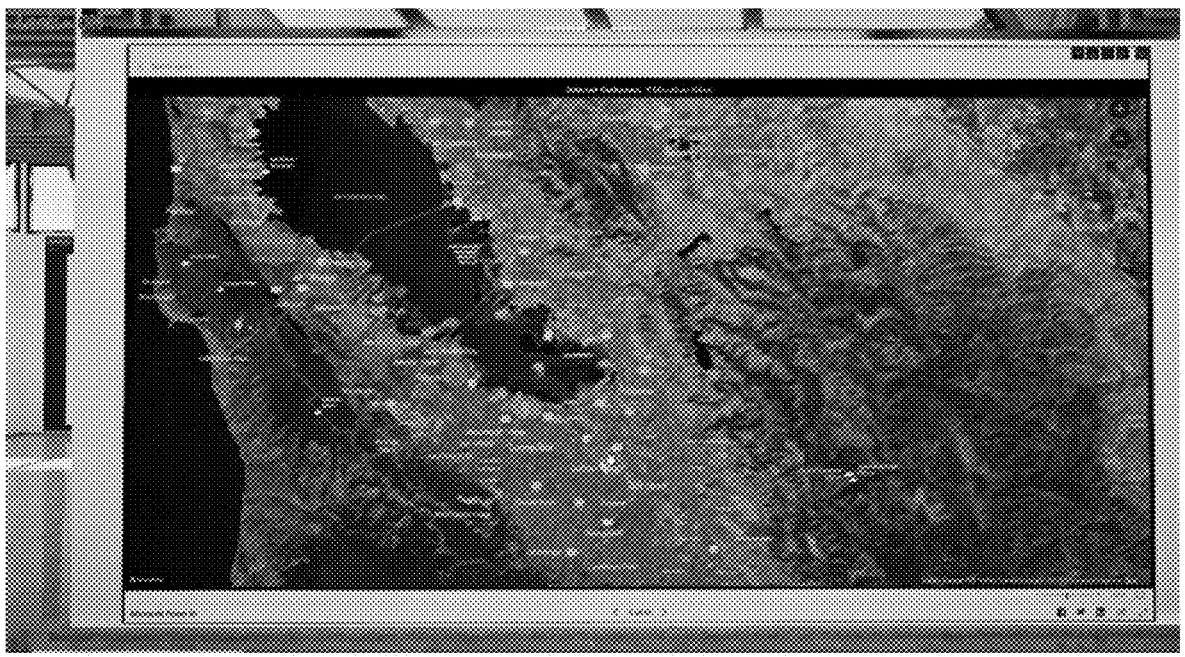

As one illustration, consider, for example, FIG. 18. Embodiment 1800 of FIG. 18 shows graphical lines rendered for multiple products of a bicycle company. In FIG. 19, however, through mouse clicks, in this example, with respect to the 3D virtual display, one line of those shown in FIG. 18 is now displayed, so as to drill down further on sales of the product associated with that line. Furthermore, with further mouse clicks, for example, again, with respect to the 3D virtual display, via additional content being rendered via interacting with the content of the 3D virtual display, and shown in succession by FIGS. 19-22, a user is able to drill down further on sales locations and determine, for example, sales opportunities for this particular product. FIG. 22, for example, shows that the bicycle company has little sales presence in San Jose, CA a highly populated area of California, suggesting an opportunity to increase product sales in that region. It is further noted, here, but not shown, that to the extent different 3D virtual displays are related or associated in terms of real-time content being rendered, a change made by a user with respect to the content for one 3D virtual display may potentially have a "ripple effect" on the content shown on various other related or associated 3D virtual displays, similar to the manner in which changing the value in a cell of an excel spreadsheet may ripple changes to other cells across that spreadsheet. Such a capability, of course, may be quite powerful for inter-related real-time content, specifically web browser derived real-time content, populating a cluster of 3D virtual displays within a 3D gaming environment.

Returning to the example menu for embodiment 1300, it may include a mechanism to provide a museum-type gaming environment, which might be shown as a selection of "go to art gallery," denoted 1305, and a mechanism to provide a control center-type gaming environment, which might be shown as a selection of "go to control center," denoted 1310, assuming, for an embodiment, as an example, the particular gaming environments are active. With multiple gaming environments active, an ability to switch between multiple virtual sets and/or multiple 3D environments, as non-limiting examples, may be implemented.

In an embodiment, for example, a mouse click and/or similar user action, in the close vicinity of these selections on the screen, may provide a signal indicating a selection by the user. In an embodiment, selecting "go to art gallery," 1305, might take the user to a museum-type gaming environment with 20 3D virtual displays rendered in a suitable museum arrangement, if currently active, whereas selecting "art gallery 40 screens," 1312, might take a user to a museum-type gaming environment with 40 3D virtual displays shown in a museum type gaming environment, if currently active. Furthermore, if multiple gaming environments are active, in an embodiment, these selections may permit switching between active gaming environments. For example, a user may want to compare displaying the same or similar content, for example, in different templated 3D gaming environments.

Selecting another particular mode of operation, referred to, here, as "replay" virtual navigation mode, as illustrated in FIG. 13 by a rectangularly shaped overlay 1301 shown on top of rendered computer-generated content, may, for an embodiment, be entered via selecting 1325, "replay." In replay mode, a user may be able to virtually navigate along a preset virtual path within the gaming environment, as previously discussed. For example, at the beginning of "replay," a user may, in an embodiment, via the replay selection, be "transported" (via rendering, for example) to an opening view of the 3D gaming environment created for this purpose, such as a corner shot of multiple 3D virtual displays, illustrated, for example, as the computer-generated scene beneath the rectangular overlay in FIG. 13, or alternately, illustrated by embodiment 1000 of FIG. 10, provided as two suitable examples.

Thus, again, as simply one example of a mode of navigation, a path of virtual navigation for a user may have been created during the editing process, such as one intended to virtually take the user to different 3D virtual displays in a particular order, for example. A guided virtual museum tour may be one non-limiting example of such a mode of navigation. In replay mode, for example, once or after a particular 3D display is reached via virtual navigation along a preset path, perhaps, via a mouse click, a keyboard key, or some other actuation of some other input device by a user, virtual navigation might be paused in front of the particular 3D display, but virtual navigation to the next 3D virtual display of the preset path may be resumed as well via a similar type of actuation via an input device. Embodiment 900 of FIG. 9, for example, as previously discussed, illustrates one embodiment.

In general, stopping and resuming virtual navigation between different 3D virtual displays along the preset path is smooth, rather than as jumps, in this mode, unless a user employs a button, such as one of the buttons shown on the bottom of FIG. 9 as part of embodiment 900, to "jump" or "teleport" to another 3D virtual display. Furthermore, if paused, a user may then interact with the 3D virtual display, as discussed previously in the context of describing "lock on" and "lock off" modes. Likewise, in "replay" mode, the user might have the option to record as the preset path is traversed via virtual navigation by selecting "record" (not shown) at the beginning of "replay." If the user ultimately were to later decide not to retain what has been recorded, it might be discarded by then selecting "remove," (not shown). It is likewise noted that after loading a "virtual set," using "load," denoted 1330, in FIG. 13, the virtual set loaded may be removed via "remove," denoted 1335, which is different from the "remove" for "replay" mode, which is not shown in FIG. 13.

In addition to the "replay" option, for the menu, shown on the left of embodiment 1300, other options under "load virtual set" are shown. For example, a "screens" selection, 1340, is shown. This selection might show in the computer-generated gaming environment, the particular number of the particular 3D virtual displays that have been rendered, as illustrated by FIGS. 11 and 23, for example. This feature was also illustrated in the embodiment of FIG. 10, in which 3D virtual display numbers are shown, even while web browser derived real-time content is also displayed. As shown, the numbers appear, in this example, as an overlay on top of the web browser derived real-time content.

FIG. 13 also illustrates a selection "options," 1345, beneath "load virtual set." This may, in an embodiment, permit a user to, with respect to a virtual set loaded or, perhaps, with respect to a virtual set to be loaded, customize certain aspects of the loaded or to be loaded 3D gaming environment. For example, other virtual navigation options (not shown) might, perhaps, be selected. For example, perhaps alternate preset paths may have been created (not shown) and/or other virtual navigation modes may be an option, such as example navigation modes discussed below, as illustrations.

FIG. 13 also illustrates a "continue" selection, 1350, and a "go to menu" selection, 1360. In an embodiment, for example, selecting "continue," 1350, might return a user to the user's "place" within the gaming environment before the user had "pulled up" the menu illustrated by FIG. 13, such as by a particular key stroke, for example. "Go to menu" may, for example, in an embodiment, take a user to a main selection menu (not shown) or perhaps, to an expansion (not shown) of the menu that is illustrated by FIG. 13. For example, the menu of FIG. 13 might be expanded if additional 3D gaming environments are to be computer generated, for example, in which three-dimensional (3D) virtual displays may be arranged in a configuration within the 3D gaming environment so as to be able to virtually navigate between and/or among the 3D virtual displays and in which the 3D virtual displays are to be populated with web browser derived real-time content. However, perhaps, instead, in an embodiment, "go to menu," might "pull up" a more complex menu, as shown, for example, by embodiment 1500, illustrated in FIG. 15, and perhaps better described as a master controller user interface (UI) for the 3D virtual displays and the gaming environment, described in more detail below. Of course, the foregoing are just illustrative examples. Claimed subject matter is not intended to be limited to illustrative examples and/or embodiments.

Figure 15:
FIG. 15 is a window illustrating an embodiment of a master controller user interface for a computer-generated three-dimensional (3D) gaming environment that includes one or more 3D virtual displays to provide real-time visualizations of web browser derived content in accordance with claimed subject matter.

As previously suggested, embodiment 1500 of FIG. 15 may be thought of as a master controller user interface for the gaming environment, including the 3D virtual displays. A "first person" user, with respect to a particular computer-generated 3D virtual display, may, as examples, setup, turn on or off, refresh, provide a name to, via a drop-down window change displayed content for, and even generate new "content" for particular 3D virtual displays within a 3D gaming environment at anytime and/or from anywhere.

For example, across the top of embodiment 1500 are several choices that may permit a user to affect the 3D gaming environment. In general, these are, as a group, intended to be denoted by 1510, as shown. These choices include "ceiling," "people," "floor art," "wall," "time" and the succession of choices denoted with a B followed by a number, such as "B-1," etc., which are reserved for special purposes. In addition, other choices may affect how the gaming environment looks once or after rendering, such as "screen brightness" and/or "exposure." Likewise, there is a choice "back" which may return the user back to the active gaming environment or "go to menu" which may result in the menu previously described with respect to FIG. 16 appearing, for example.

The master controller user interface of embodiment 1500 also may permit control over content being "played" or to be "played" within a selected 3D virtual display. For example, as shown in previous figures, and even shown in this figure, 3D virtual display numbers may be provided with a 3D virtual display. Here, for example, in FIG. 15, a 3D virtual display number is seen beneath a rectangular overlay. For example, 3D virtual display 2 is readily apparent in FIG. 15. Hence, to illustrate this feature with respect to 3D virtual display 2, controls for 3D virtual display 2 are shown across a row, which appears as the second row below the set of choices discussed above and denoted as 1510 in FIG. 15.

For example, along the left-hand side of the master controller user interface, a designation "SCREEN 2 (S-2)," denoted as 1520 in FIG. 15, may be associated with 3D virtual display 2. Immediately along that row, to the right of "SCREEN 2 (S-2)," a blank area is present in that row. For example, if a user wanted to name the content to appearing on 3D virtual display 2, a name might be entered here. An embodiment might, for example, include a content and/or similar guide, which is often made available to users of various cable channel and/or broadcast network options. These guides often name the specific content along with providing additional information describing the content. Continuing further to the right along the same row, a type of "switch" able to be toggled is shown. It is designated 1530 and appears below "screen brightness" in FIG. 15 on the master controller user interface. This switch may be used to toggle 3D virtual display 2 to be on or to be off within the 3D gaming environment. Next to the switch, on the right, is an a "refresh" button for 3D virtual display 2, depicted as 1555 with an circular design shown on the button that is not a "closed" geometric shape. On the right of the refresh button is a type of URL, called a "tinyurl" in the figure, which may designate a location for the content that is intended to be "played" on 3D virtual display 2 within the gaming environment.

One should notice to the right of the "tinyurl" is a tab 1540 for a pulldown menu. In particular, in FIG. 15, tab 1540 is shown as selected and so a pulldown menu 1550 of URLs (e.g., tinyurls) is shown. Selecting tab 1540 may be used to "open" pulldown menu 1550 with respect to 3D virtual display 3, for example (rather than 3D virtual display 2, which has a tab for a pull down menu above tab 1540). Thus, to change the content to be "played" on 3D virtual display 3 within the gaming environment, a user may select a different tinyurl within pull down menu 1550. Content associated with the selected tinyurl may as a result be shown via 3D virtual display 3 within the 3D gaming environment, after being loaded, for example. Of course, the foregoing is simply one illustrative embodiment and claimed subject matter is not intended to be limited to illustrative embodiments.

As mentioned previously, FIG. 11 is an example of a control room or mission control type configuration of 3D virtual displays within a 3D gaming environment. It is also noted that another example embodiment showing a control room type configuration with a host of 3D virtual displays that render web browser derived real-time content is illustrated by FIG. 24. Again, this are two illustrative examples and not intended to limit the scope of claimed subject matter. Nonetheless, with this in mind, one may generally ask: Why do generals have war rooms, pilots have cockpits, NASA have mission control centers, ship's captains have command bridges, and factories have control rooms? To make the point more clearly, an advantage of a configuration like this is the capability, though this virtual presentation of web browser derived real-time content, to make more intelligent, more insightful, more visual, more collaborative and, potentially even, closed loop or semi-closed loop type decisions. Here, a virtual control room, in an embodiment, may be real-time, closed-loop (or semi-closed loop) with situational awareness for continued and/or continuous executive decision making virtually from anywhere, anytime and on nearly any device. Here, the term "semi-closed loop" is to refer to a situation in which human knowledge, intuition, judgement, understanding, etc., in essence, closes the loop, so to speak. However, in an embodiment, in effect, closed or semi-closed loop operation may also be implemented.

Thus, using, for example, human knowledge, intuition, judgement, understanding, etc., in a group situation, for example, many users may virtually view displayed content via a 3D gaming environment in which content is shown on multiple 3D virtual displays, such as content for a variety of functional departments, such as for a business, including, for example, sales, accounting, finance, operations, marketing, purchasing, etc., resulting in real-time collaboration, such as via user interaction with selected ones of the multiple 3D virtual displays, to make decisions with respect to the business. The results produced by those decisions may then be observed in real-time and/or via predictive analytics, using various simulations etc., which may then produce more real-time collaboration and further decisions with respect to the business, etc., etc., and thereby resulting in at least semi-closed loop implementation and/or operation.

Continuing with such an embodiment, decisionmakers may include, for a consumer environment, those having a virtual visit to a museum, virtually walking through an exposition, or virtually experiencing an institution's Hall of Fame, or, for a business environment, a CEO, executive staff (e.g., CFO, COO, CSO, CIO, etc.) a founder, partners, etc., as non-limiting examples. One may, therefore, envision, in group type work situations, for example, any combination of synchronous and/or asynchronous use of a mechanism to computer generate a 3D gaming environment including a configuration of 3D virtual displays in the manner previously described. In one example, in addition to the described 3D gaming environment, for an embodiment, one may also imagine a Zoom type or Microsoft Teams type environment for communication between the users, for example, in which the 3D virtual displays of the 3D gaming environment may show web browser derived real-time content that, ordinarily, would not be easy to visualize in the real world, for various functional departments across a company, especially in one navigable, virtual 3D viewing environment. This is not unlike the example illustrated by FIGS. 18-22, a real-time assessment of product sales, for example, to identify opportunities for further sales, including, in this example, multiple stakeholders involved in real-time collaboration.

Continuing with the business example above, a first person user, such as a CEO, and several third person users, may be, in effect, sharing a 3D gaming environment, as described, in which the 3D virtual displays may show web browser derived real-time content that, again, ordinarily, would not be easy to visualize in the real world and certainly not in real-time across a host of functional departments, especially not in one navigable, virtual 3D viewing environment. These users from, again, as merely examples, accounting, purchasing, sales, finance, marketing, and/or operations, may respectively have 3D virtual displays providing various visualizations of signal information that relate to their respective functional departments to be shown to the CEO, in this example. However, likewise, it may be desirable for collaboration to occur as the various departments are able to show, discuss and interact with the respective visualizations. As suggested previously, although there is a single "first person" user, this status may be passed back and forth between "third person" users, allowing group collaboration via a shared gaming environment. As suggested, an advantage of a configuration like this is the capability, though a virtual presentation of web browser derived real-time content, to make more intelligent, more insightful, more visual, more collaborative and, potentially even, closed loop or semi-closed loop type decisions. For example, in addition to visualizations providing relevant content regarding the state of various departments of the company, likewise, a host of predictive analytical approaches exist to extrapolate from the present state of various departments and/or the company overall to gain insight into where the company may be headed, such as its finances, it's revenue, it's operating costs, etc. For example, various simple and/or more complex approaches to predictive analytics, to business simulation, and/or to market simulation, etc., may be employed within a 3D gaming environment, as has been described.

In yet another situation, again, a CEO, a member of executive staff, a partner, a Board Member, etc., might be "stuck" on a long flight, such as from Asia to the United States. A busy individual in this situation may have planned ahead and may have the desire to stay current with the latest available company reports and analysis. He or she might have brought a stack of reports or may even have a wide range of content stored on a laptop, buried across a range of emails, word documents, power point slides, accounting statements, etc. However, instead, with a virtual simulation device comprising a standard laptop and virtual reality googles able to wirelessly connect to the laptop, that individual may be able to computer generate the type of gaming environment previously described, such as by using a template, as one example, in which the individual may navigate across a variety of 3D virtual displays and interact with selected 3D displays providing web browser derived real-time content about the company. For example, most commercial flights now provide a capability to connect to the internet. Thus, this individual may even collaborate, while in flight, with one or many other company personnel in a manner previously suggested, for example, in connection with a business, As still another example, FIG. 26 is a schematic diagram of a closed loop process for driving a car, which may be implemented via an embodiment 2600 in accordance with claimed subject matter. The figure shows the closed loop process as implemented in a self-driving car. However, this could just as easily be provided as an example of a closed loop process in which a human driver, in effect, closes the loop. For example, a typical car includes a steering wheel, denoted 2610 in FIG. 26, and an accelerator pedal, a brake and sometimes a gear shifter. These last three instruments for driving are not shown. However, these may all be operated by a human driver for use in direct the motion of a car. The car also includes real-time instrumentation, such as via a speedometer, a tachometer, etc. In an embodiment, a human driver may consume this "real-time content" via a heads up display, denoted 2620, as shown in FIG. 26. Likewise, a GPS system, shown by map 2630, is included. A human driver also has access to a rear-view mirror, denoted 2640, two side view mirrors, denoted 2650, and a windshield denoted 2660.

Thus, analogously to a closed loop and/or semi-closed loop process in connection with a business, as previously discussed, an advantage of a configuration using a virtual presentation of web browser derived real-time content is that it provides an opportunity to make more intelligent, more insightful, more visual, more collaborative and, potentially, closed loop or semi-closed loop type decisions. The same might be said of this example closed loop and/or semi-closed loop process, illustrated in FIG. 26. For example, real-time content about where the car is and/or was may be provided, such as via a GPS system, various mirrors and/or various instrumentation, as described. Likewise, the windshield, not unlike predictive analytics and/or simulations, provides content describing where the car may be headed. Thus, a human driver and/or a computing device with appropriate software, may be able to make decisions, such as how to steer, how to engage the accelerator, brake and gear shift, etc., to make decisions about where to direct the car.

FIG. 26 is provided as an example to demonstrate the incredible capability of the human brain to digest and/or process such content, while even engaging in other activities, such as listening to music, having a phone call, etc., as is commonly done while driving. As was stated above, "[t]he eye and the visual cortex of the brain form a massively parallel processor that provides the highest-bandwidth channel into human cognitive centers." Hence, these visual and mental processes may also be captured for other uses, some of which are previously described, including to direct a business, through computer generating a three-dimensional gaming environment. The computer generating may include computer generating at least three three-dimensional (3D) virtual displays arranged in a configuration within the 3D gaming environment and computer generating the 3D virtual displays within the 3D gaming environment so as to be able to virtually navigate within the 3D gaming environment in a manner between and/or among the 3D virtual displays, for example. Likewise, the 3D virtual displays may be populated with computer-generated web browser derived real-time content. In this manner, one or many human decision makers may digest content about a business showing where it has been and/or where it is, for example, in real-time, as well as where it is headed, to decide whether to stay the course, "make turns," etc.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular and/or the plural, "and/or" is also used to describe a plurality and/or some other combination of features, structures, characteristics, and/or the like. Likewise, the terms "based", "based on" and/or similar terms are understood as not necessarily intending to convey an exhaustive list of factors, but to allow for existence of additional factors not necessarily expressly described.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter and/or patent eligibility. Rather, it is asserted, that physical measurements are not mental steps and, likewise, are not abstract ideas. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more other memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combinations thereof. As mentioned, signal packets and/or frames, for example, may be exchanged, such as between a server device and/or a client device, as well as other types of devices, including between wired and/or wireless devices coupled via a wired and/or wireless network, for example, or any combinations thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combinations thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The terms electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content," "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the terms attributes (e.g., one or more attributes) and/or parameters (e.g., one or more parameters) refer to material descriptive of a collection of signal samples, such as one or more electronic documents and/or electronic files, and exist in the form of physical signals and/or physical states, such as memory states. For example, one or more parameters and/or attributes, such as referring to an electronic document and/or an electronic file comprising an image, may include, as examples, time of day at which an image was captured, latitude and longitude of an image capture device, such as a camera, for example, etc. In another example, one or more parameters and/or attributes relevant to digital content, such as digital content comprising a technical article, as an example, may include one or more authors, for example. Claimed subject matter is intended to embrace meaningful, descriptive attributes and/or parameters in any format, so long as the one or more parameters and/or attributes comprise physical signals and/or states, which may include, as examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, PCI and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, $4^{th}$ and/or 5th generation (2G, 3G, 4G, and/or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

In one example embodiment, as shown in FIG. 2, a system embodiment may comprise a local network (e.g., device 204 and medium 240) and/or another type of network, such as a computing and/or communications network. For purposes of illustration, therefore, FIG. 2 shows an embodiment 200 of a system that may be employed to implement either type or both types of networks. Network 208 may comprise one or more network connections, links, processes, services, applications, and/or resources to facilitate and/or support communications, such as an exchange of communication signals, for example, between a computing device, such as 202, and another computing device, such as 206, which may, for example, comprise one or more client computing devices and/or one or more server computing device. By way of example, but not limitation, network 208 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 2 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or any other terms, then, it is intended, pursuant to that statutory section, that corresponding structure, material and/or acts for performing one or more functions be understood and be interpreted to be described at least in FIGS. 1, 2, 5-11, and 13-26 and in the text associated with the foregoing figure(s) of the present patent application.

In FIG. 2, computing device 202 may provide one or more sources of executable computer instructions in the form physical states and/or signals (e.g., stored in memory states), for example. Computing device 202 may communicate with computing device 204 by way of a network connection, such as via network 208, for example. As previously mentioned, a connection, while physical, may not necessarily be tangible. Although computing device 204 of FIG. 2 shows various tangible, physical components, claimed subject matter is not limited to a computing device having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 222 may comprise any non-transitory storage mechanism. Memory 222 may comprise, for example, primary memory 224 and secondary memory 226, additional memory circuits, mechanisms, or combinations thereof may be used. Memory 222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 222 may be utilized to store a program of executable computer instructions. For example, processor 220 may fetch executable instructions from memory and proceed to execute the fetched instructions. Memory 222 may also comprise a memory controller for accessing device readable-medium 240 that may carry and/or make accessible digital content, which may include code, and/or instructions, for example, executable by processor 220 and/or some other device, such as a controller, as one example, capable of executing computer instructions, for example. Under direction of processor 220, a non-transitory memory, such as memory cells storing physical states (e.g., memory states), comprising, for example, a program of executable computer instructions, may be executed by processor 220 and able to generate signals to be communicated via a network, for example, as previously described. Generated signals may also be stored in memory, also previously suggested.

Memory 222 may store electronic files and/or electronic documents, such as relating to one or more users, and may also comprise a computer-readable medium that may carry and/or make accessible content, including code and/or instructions, for example, executable by processor 220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, attributes, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 2, processor 220 may comprise one or more circuits, such as digital circuits, to perform at least a portion of a computing procedure and/or process. By way of example, but not limitation, processor 220 may comprise one or more processors, such as controllers, microprocessors, microcontrollers, application specific integrated circuits, digital signal processors, programmable logic devices, field programmable gate arrays, the like, or any combinations thereof. In various implementations and/or embodiments, processor 220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 2 also illustrates device 204 as including a component 232 operable with input/output devices, for example, so that signals and/or states may be appropriately communicated between devices, such as device 204 and an input device and/or device 204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals, referred to, for example, as a speaking event. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. An apparatus comprising: a computing device;
   wherein the computing device comprises one or more processors, wherein the one or more processors are coupled to one or more physical memories via one or more buses;
   wherein at least one of the one or more physical memories comprise stored instructions executable by the one or more processors; and
   wherein at least one of the one or more physical memories is capable of storing in one or more memory locations as physical memory states any results from execution by the one or more processors of the stored executable instructions;
   wherein the stored executable instructions comprise instructions, as a result of execution, at least to:
   computer generate a three-dimensional gaming environment to include at least three three-dimensional (3D) virtual displays within the 3D gaming environment to be arranged in a configuration within the 3D gaming environment and to include the 3D virtual displays within the 3D gaming environment so as to be able to virtually navigate within the 3D gaming environment in a manner at least between and/or among the 3D virtual displays;
   populate one or more of the 3D virtual displays with computer generated web browser derived real time content;
   wherein the stored executable instructions comprise instructions, as a result of execution, are further to:
   pixel stream via a standard internet connection to at least one standard business laptop and/or to at least one similar computing device of similar capabilities, at least portions of the computer generated 3D gaming environment with the at least three 3D virtual displays and to pixel stream the computer generated web browser derived real-time content to populate the 3D virtual displays within the computer generated 3D gaming environment so that the computer generated web browser derived real-time content within the computer generated 3D gaming environment appears three-dimensional by appearing on the one or more 3D virtual displays within the computer generated 3D gaming environment.

2. The apparatus of claim 1, An apparatus comprising: a computing device,
   wherein the computing device comprises one or more processors, wherein the one or more processors are coupled to one or more physical memories via one or more buses;
   wherein at least one of the one or more physical memories comprise stored instructions executable by the one or more processors; and
   wherein at least one of the one or more physical memories is capable of storing in one or more memory locations as physical memory states any results from execution by the one or more processors of the stored executable instructions;
   wherein the stored executable instructions comprise instructions, as a result of execution, at least to:
   computer generate a three-dimensional gaming environment to include at least three three-dimensional (3D) virtual displays within the 3D gaming environment to be arranged in a configuration within the 3D gaming environment and to include the 3D virtual displays within the 3D gaming environment so as to be able to virtually navigate within the 3D gaming environment in a manner at least between and/or among the 3D virtual displays;
   populate one or more of the 3D virtual displays with computer generated web browser derived real time content;
   wherein the stored executable instructions comprise instructions, as a result of execution, are further to:
   stream, via a standard internet connection to at least one standard business laptop and/or to at least one similar computing device of similar capabilities, portions of computer generated 3D virtual display content within the 3D gaming environment so that at least one remote user and one or more other remote users are able to collaborate in real-time by selected remote users being able to interact in real-time with at least one of the 3D virtual displays and/or with the computer generated web browser derived real-time content via at least one of: mouse clicks, keyboard touch events, screen touch events, remote control actuation events, speaking events or any combinations thereof.

3. An article comprising: a non-transitory storage medium;
   wherein the storage medium includes stored thereon executable instructions; and
   wherein the instructions are executable to perform the following method:
   computer generating a three-dimensional gaming environment;

wherein the computer generating includes computer generating at least three three-dimensional (3D) virtual displays arranged in a configuration within the 3D gaming environment and computer generating the 3D virtual displays within the 3D gaming environment so as to be able to virtually navigate within the 3D gaming environment in a manner at least between and/or among the 3D virtual displays; and populating one or more of the 3D virtual displays with computer generated web browser derived real-time content;

wherein the instructions are further executable to perform:

pixel streaming via a standard internet connection to at least one standard business laptop and/or to at least one similar computing device of similar capabilities, at least portions of the computer generated 3D gaming environment with the at least three 3D virtual displays and pixel streaming the computer generated web browser derived real-time content to populate the 3D virtual displays within the computer generated 3D gaming environment so that the computer generated web browser derived real-time content within the computer generated 3D gaming environment appears three-dimensional by appearing on the one or more 3D virtual displays within the computer generated 3D gaming environment.

4. An article comprising: a non-transitory storage medium;

wherein the storage medium includes stored thereon executable instructions; and wherein the instructions are executable to perform the following method:

computer generating a three-dimensional gaming environment;

wherein the computer generating includes computer generating at least three three-dimensional (3D) virtual displays arranged in a configuration within the 3D gaming environment and computer generating the 3D virtual displays within the 3D gaming environment so as to be able to virtually navigate within the 3D gaming environment in a manner at least between and/or among the 3D virtual displays; and populating one or more of the 3D virtual displays with computer generated web browser derived real-time content;

wherein the stored executable instructions comprise instructions, as a result of execution, that are further to perform:

streaming, via a standard internet connection to at least one standard business laptop and/or to at least one similar computing device of similar capabilities, portions of computer generated 3D virtual display content within the 3D gaming environment so that at least one remote user and one or more other remote users are able to collaborate in real-time by selected remote users being able to interact in real-time with at least one of the 3D virtual displays and/or with the computer generated web browser derived real-time content via at least one of: mouse clicks, keyboard touch events, screen touch events, remote control actuation events, speaking events or any combinations thereof.

5. An article comprising: a non-transitory storage medium;

wherein instructions thereon are executable to perform the following method:

computer generating a three-dimensional gaming environment;

wherein the computer generating includes computer generating at least three three-dimensional (3D) virtual displays arranged in a configuration within the 3D gaming environment and computer generating the 3D virtual displays within the 3D gaming environment so as to be able to virtually navigate within the 3D gaming environment in a manner between and/or among the 3D virtual displays; and wherein the computer generating a three-dimensional gaming environment comprises computer generating a fully immersive, photorealistic three-dimensional (3D) gaming environment with real-time ray tracing;

populating the 3D virtual displays with computer-generated web browser derived real-time content, wherein the populating comprises generating the computer-generated web browser derived real-time 3D content within the gaming environment; and streaming via a standard internet connection at least portions of the computer-generated fully immersive, photorealistic 3D gaming environment real-time ray tracing with the at least three 3D virtual displays and thereby generating computer generated web browser derived real-time content for at least one remote user operating a standard laptop or similar computing device of similar capabilities so that the at least one remote user is able to interact in real-time with at least one of the 3D virtual displays and/or its computer generated web browser derived real-time content via at least one of: mouse clicks, keyboard touch events, screen touch events, remote control actuation events, speaking events or any combinations thereof.

6. The article of claim 5, wherein the storage medium includes stored thereon executable instructions, the executable instructions are capable of being executed via one or more processors, wherein the one or more processors are to be coupled to one or more physical memories via one or more buses;

wherein at least one of the one or more physical memories are to comprise stored instructions executable by the one or more processors; and wherein at least one of the one or more physical memories is to be capable of storing in one or more memory locations as physical memory states any results from execution by the one or more processors of the stored executable instructions, wherein the stored executable instructions comprise instructions are executable, at least to perform the following method:

generating a collaborative virtual 3D situation center and/or room within the 3D gaming environment to provide business situational awareness to business decision makers from the computer generating and from the streaming;

wherein the streaming further comprises streaming the at least portions of a computer-generated fully immersive, photorealistic 3D gaming environment to one or more other remote users in which at least some of the remote users comprise business decision makers so that the business decision makers are able to collaborate in real-time within the collaborative virtual 3D situation center and/or room to provide business situational awareness to at least some of the remote business decision makers at least in part by being able to interact in real-time with at least one of the 3D virtual displays and/or its computer generated web browser derived real-time content via at least one of: mouse clicks, keyboard touch events, screen touch events, remote control actuation events, speaking events, or any combinations thereof.

7. The article of claim 6, wherein the generating a collaborative virtual 3D situation center and/or room to provide business situational awareness to at least some business decision makers is to comprise generating a 3D virtual executive information system (EIS).

8. The article of claim 7, wherein the 3D virtual EIS is to comprise an executive real-time information system.

9. The article of claim 6,
wherein the instructions are further executable to perform:
generating real-time visualizations in a 3D gaming environment, in which the 3D virtual displays provide web browser derived real-time content, across various functional departments of a business, in the virtual 3D viewing environment that is to comprise the collaborative virtual 3D situation center and/or room providing business situational awareness to the at least some business decision makers for the business.

10. The article of claim 6, wherein the functional departments at least include accounting, purchasing, sales, finance, marketing, and/or operations so that the various departments of the business shall be able to show, discuss and/or interact with the respective real-time 3D visualizations in the 3D gaming environment.

11. The article of claim 6, wherein the real-time visualizations in a 3D gaming environment to be provided by the collaborative virtual 3D situation center and/or room are to enable closed-loop and/or semi-closed loop type decisions by the at least some business decision makers with the potential to result in more intelligent, more informed, more insightful, more visual, and/or more collaborative decisions with respect to the business.

12. The article of claim 6, wherein the real-time visualizations to provide real-time relevant content in a 3D gaming environment regarding a past and present state of the business is to include predictive analytical approaches to extrapolate from the past and present state of the business to gain potential insight regarding where the business is potentially headed in terms of at least one or more of the following: finances, revenue, and/or operating costs.

* * * * *

UNITED STATES PATENT AND TRADEMARK OFFICE
CERTIFICATE OF CORRECTION

PATENT NO. : 12,165,263 B1
APPLICATION NO. : 18/431845
DATED : December 10, 2024
INVENTOR(S) : Dennis M. Futryk and Charles H. House Page 1 of 1

It is certified that error appears in the above-identified patent and that said Letters Patent is hereby corrected as shown below:

In the Claims

In Claim 2, following "claim 1", delete ", An apparatus comprising"

Signed and Sealed this
Eighteenth Day of March, 2025

Coke Morgan Stewart
*Acting Director of the United States Patent and Trademark Office*